(12) United States Patent
Yamazaki

(10) Patent No.: US 9,643,501 B2
(45) Date of Patent: May 9, 2017

(54) VEHICLE INCLUDING POWER STORAGE UNIT

(71) Applicant: SEMICONDUCTOR ENERGY LABORATORY CO., LTD., Atsugi-shi, Kanagawa-ken (JP)

(72) Inventor: Shunpei Yamazaki, Tokyo (JP)

(73) Assignee: Semiconductor Energy Laboratory Co., LTD., Kangawa-ken (JP)

( * ) Notice: Subject to any disclaimer, the term of this patent is extended or adjusted under 35 U.S.C. 154(b) by 1 day.

(21) Appl. No.: 14/154,506

(22) Filed: Jan. 14, 2014

(65) Prior Publication Data

US 2014/0203738 A1    Jul. 24, 2014

(30) Foreign Application Priority Data

Jan. 21, 2013   (JP) .................. 2013-008726

(51) Int. Cl.
*H02P 1/00* (2006.01)
*B60L 11/18* (2006.01)
(Continued)

(52) U.S. Cl.
CPC ......... *B60L 11/1809* (2013.01); *B60L 3/0046* (2013.01); *B60L 3/12* (2013.01); *B60L 11/1859* (2013.01); *B60L 11/1862* (2013.01); *H01M 4/13* (2013.01); *H01M 10/0525* (2013.01); *H01M 10/44* (2013.01); *H01M 10/441* (2013.01);
(Continued)

(58) Field of Classification Search
CPC ............. H01M 10/4207; H01M 10/44; H01M 2010/4271; H01M 10/625; H02J 1/10; H02J 7/00; H02J 7/0013; H02J 7/0054; H02J 7/14

USPC .................. 318/139, 34, 41, 106, 722, 440; 180/65.28, 65.285, 65.29, 65.51; 320/124, 126, 130, 132, 134, 140
See application file for complete search history.

(56) References Cited

U.S. PATENT DOCUMENTS 4,237,410 A * 12/1980 Erickson ............. B60L 11/1853
                                                      318/139
4,310,793 A *  1/1982 Sheldrake et al. ............. 322/28
(Continued)

FOREIGN PATENT DOCUMENTS

JP      05-152002 A      6/1993
JP      H05-152002 A     6/1993
(Continued)

*Primary Examiner* — Bentsu Ro
*Assistant Examiner* — Thai Dinh
(74) *Attorney, Agent, or Firm* — Nixon Peabody LLP; Jeffrey L. Costellia

(57) ABSTRACT

Deterioration of a power storage unit included in a vehicle is prevented or the power storage unit that has deteriorated is repaired, and the charge and discharge performance of the power storage unit is maximized to be maintained for a long time. Attention has focused on a reaction product formed on an electrode surface which causes malfunction or deterioration of a power storage unit such as a lithium-ion secondary battery. In the power storage unit used for a vehicle that runs on the power of an electric motor, rapid discharge occurring in the acceleration of the vehicle or the like tends to promote the solidification of the reaction product. The reaction product is removed by application of an electrical stimulus, specifically, an inversion pulse voltage.

16 Claims, 25 Drawing Sheets

(51) Int. Cl.
*H01M 10/44* (2006.01)
*H01M 4/13* (2010.01)
*H01M 10/0525* (2010.01)
*B60L 3/00* (2006.01)
*B60L 3/12* (2006.01)
*H02J 1/10* (2006.01)
*H02J 7/00* (2006.01)
*H02J 7/14* (2006.01)
*H02J 7/34* (2006.01)

(52) U.S. Cl.
CPC ............ *H02J 1/102* (2013.01); *H02J 7/0073* (2013.01); *H02J 7/1423* (2013.01); *H02J 7/34* (2013.01); *Y02E 60/122* (2013.01); *Y02T 10/705* (2013.01); *Y02T 10/7011* (2013.01); *Y02T 10/7044* (2013.01); *Y02T 10/7072* (2013.01); *Y02T 10/7077* (2013.01); *Y02T 90/14* (2013.01); *Y10S 903/907* (2013.01)

(56) References Cited

U.S. PATENT DOCUMENTS

| | | | | |
|---|---|---|---|---|
| 4,348,628 A * | 9/1982 | Loucks | ................ | H02J 7/1423 180/65.1 |
| 4,689,531 A * | 8/1987 | Bacon | ................ | B60L 11/126 318/139 |
| 6,158,541 A * | 12/2000 | Tabata | ................ | B60K 6/28 180/165 |
| 6,476,571 B1 * | 11/2002 | Sasaki | ................ | B60K 6/26 180/65.1 |
| 6,734,645 B2 * | 5/2004 | Auerbach | ................ | B60L 7/16 318/139 |
| 7,795,844 B2 * | 9/2010 | Ichikawa | ............ | H01M 10/613 320/134 |
| 7,851,954 B2 * | 12/2010 | Endo | ................ | B60K 6/26 310/68 D |
| 7,866,425 B2 * | 1/2011 | King | ................ | B60L 7/06 180/65.31 |
| 7,934,573 B2 * | 5/2011 | Fassnacht | ................ | B60K 6/48 180/65.21 |
| 8,120,291 B2 * | 2/2012 | Clark | ................ | B60L 3/108 303/124 |
| 8,603,687 B2 * | 12/2013 | Hamada | ................ | B60L 1/003 307/18 |
| 2009/0315518 A1 * | 12/2009 | Soma | ................ | B60K 6/445 320/134 |
| 2010/0156352 A1 * | 6/2010 | Muta et al. | ................ | 320/134 |
| 2010/0188048 A1 | 7/2010 | Nishino et al. | | |
| 2010/0318252 A1 * | 12/2010 | Izumi | ................ | B60K 6/28 701/22 |
| 2011/0100735 A1 * | 5/2011 | Flett | ................ | B60K 6/46 180/65.22 |
| 2011/0294009 A1 | 12/2011 | Kawakami et al. | | |
| 2012/0055727 A1 * | 3/2012 | Omiya | ................ | B60K 6/445 180/279 |
| 2012/0293124 A1 * | 11/2012 | Hirai | ................ | H02J 7/1423 320/112 |
| 2012/0302397 A1 * | 11/2012 | Habbani | ................ | 477/5 |
| 2013/0134908 A1 * | 5/2013 | Sugiyama et al. | ................ | 318/3 |
| 2014/0197797 A1 | 7/2014 | Yamazaki | | |
| 2014/0197802 A1 | 7/2014 | Yamazaki | | |
| 2014/0199580 A1 | 7/2014 | Yamazaki | | |

FOREIGN PATENT DOCUMENTS

| | | |
|---|---|---|
| JP | 2009-181907 A | 8/2009 |
| JP | 2010-060406 A | 3/2010 |
| JP | 2011-216200 A | 10/2011 |
| JP | 2012-009418 A | 1/2012 |

* cited by examiner

VEHICLE INCLUDING POWER STORAGE UNIT

BACKGROUND OF THE INVENTION

1. Field of the Invention

The present invention relates to an object, a method, or a manufacturing method. The present invention also relates to a process, a machine, a manufacture, or a composition of matter. In particular, the present invention relates to, for example, a semiconductor device, a display device, a light-emitting device, a power storage device, a driving method thereof, or a manufacturing method thereof. In particular, the present invention relates to, for example, a power storage unit or a vehicle including the power storage unit. In particular, the present invention relates to, for example, a method for charging a power storage unit or a vehicle including the power storage unit. In particular, the present invention relates to, for example, a method for discharging a power storage unit or a vehicle including the power storage unit. The present invention relates to a power storage system. In particular, the present invention relates to, for example, a method for driving the power storage system.

Note that in this specification, the power storage unit is a collective term describing units and devices having a power storage function. Also in this specification, the electrochemical device is a collective term describing devices that can function using a power storage unit, a conductive layer, a resistor, a capacitor, and the like.

2. Description of the Related Art

In recent years, a variety of power storage units, for example, secondary batteries such as lithium-ion secondary batteries, lithium-ion capacitors, and air batteries, have been actively developed. In particular, demand for lithium-ion secondary batteries with high output and high energy density has rapidly grown with the development of the semiconductor industry, for example, in the field of portable information terminals such as mobile phones, smartphones, and laptop computers; electrical appliances such as portable music players and digital cameras; medical equipment; and next-generation clean energy vehicles such as hybrid electric vehicles (HEVs), electric vehicles (EVs), and plug-in hybrid electric vehicles (PHEVs). The lithium-ion secondary batteries as rechargeable energy sources are thus essential for today's information society.

The performance required for the lithium-ion batteries includes increased energy density, improved cycle characteristics, safe operation under a variety of environments, and longer-term reliability.

An example of the lithium-ion battery includes at least a positive electrode, a negative electrode, and an electrolyte solution (Patent Document 1).

REFERENCE

Patent Document

[Patent Document 1] Japanese Published Patent Application No. 2012-009418

SUMMARY OF THE INVENTION

A power storage unit such as a lithium-ion battery deteriorates because of repeated charge and discharge and the capacity thereof is gradually decreased. The voltage of the power storage unit is eventually out of the range where an electronic device including the power storage unit can be used, which makes the power storage unit non-functional.

In view of the above, an object of one embodiment of the present invention is to prevent deterioration of a power storage unit or the like or repair the power storage unit or the like that has deteriorated, and to maximize the charge and discharge performance of the power storage unit or the like to maintain the charge and discharge performance of the power storage unit or the like for a long time.

Power storage units are electrochemical devices whose lifetimes are difficult to estimate individually in advance. Some power storage units suddenly stop functioning because of any cause even though they were able to be charged and discharged without any problem at the time of manufacture and were shipped as quality products.

An object of one embodiment of the present invention is to prevent a power storage unit or the like from suddenly stopping functioning, and to ensure and improve the long-term reliability of each power storage unit or the like, thereby achieving a maintenance-free power storage unit or the like.

There are also some power storage units that produce heat, expand, ignite, or explode because of any cause even though they were able to be charged and discharged without any problem at the time of manufacture and were shipped as quality products. Hence, another object of one embodiment of the present invention is to ensure the safety of a power storage unit or the like.

An object of one embodiment of the present invention is to enable rapid charge and discharge of a power storage unit or the like. Another object of one embodiment of the present invention is to enable rapid charge of a power storage unit or the like. Still another object of one embodiment of the present invention is to enable rapid discharge of a power storage unit or the like.

An object of one embodiment of the present invention is to achieve a high-mileage vehicle.

An object of one embodiment of the present invention is to achieve a vehicle including a long-life power storage unit.

An object of one embodiment of the present invention is to achieve a vehicle including a highly reliable power storage unit.

An object of one embodiment of the present invention is to achieve a vehicle including an extremely safe power storage unit.

An object of one embodiment of the present invention is to achieve an electrode or the like that is unlikely to deteriorate. Another object of one embodiment of the present invention is to achieve an electrode or the like that is insusceptible to a reaction product. Another object of one embodiment of the present invention is to achieve a power storage unit, a vehicle, or the like in which a reaction product is likely to be dissolved. Another object of one embodiment of the present invention is to achieve a power storage unit, a vehicle, or the like that easily operates at low temperature. Another object of one embodiment of the present invention is to provide a novel power storage unit, vehicle, or the like.

Note that the descriptions of these objects do not disprove the existence of other objects. In one embodiment of the present invention, not all of these objects need to be achieved. Other objects will be apparent from and can be derived from the description of the specification, the drawings, the claims, and the like.

A power storage unit typified by a lithium-ion battery malfunctions or deteriorates owing to a reaction product (also referred to as dross) formed on an electrode surface. The present inventor has found the following breakthrough technological idea: in an electrochemical device that operates utilizing an electrochemical reaction, typified by a lithium-ion battery, application of an electrical stimulus prevents a reaction product from being deposited on an electrode in charging or discharging or removes the deposited reaction product from the electrode surface.

<Charge and Discharge of Lithium-ion Battery>

When a lithium-ion battery is charged, lithium ions ($Li^+$) are extracted from a positive electrode active material to an electrolyte solution, and then inserted into a negative electrode active material. Since the amount of reaction of the positive electrode active material is equal to that of the negative electrode active material, the total amount of $Li^+$ in the electrolyte solution does not change and the concentration thereof has a gradient.

<Positive Electrode Potential and Negative Electrode Potential>

The positive electrode potential is an electrochemical equilibrium potential of a positive electrode active material, and the negative electrode potential is an electrochemical equilibrium potential of a negative electrode active material. For example, the potential at which a lithium metal (Li) is in electrochemical equilibrium in an electrolyte solution is denoted by 0 V (vs. $Li/Li^+$). The same applies to other substances.

When the potential of a lithium metal is higher than 0 V (vs. $Li/Li^+$), lithium ions are dissolved and extracted from the lithium metal into an electrolyte solution, whereas when the potential of the lithium metal is lower than 0 V (vs. $Li/Li^+$), lithium ions in the electrolyte solution are deposited as lithium.

The electrochemical equilibrium potential of a lithium compound used for the positive electrode active material can be determined based on the potential of the lithium metal. For example, the electrochemical equilibrium potential of lithium iron phosphate ($LiFePO_4$) is approximately 3.5 V (vs. $Li/Li^+$). The electrochemical equilibrium potential of graphite, a negative electrode active material, is approximately 0.2 V (vs. $Li/Li^+$).

Thus, the voltage of a lithium-ion battery including lithium iron phosphate ($LiFePO_4$) as a positive electrode active material and graphite as a negative electrode active material (the electromotive force of an electrochemical cell) is 3.3 V, which is the difference in potential between the positive and negative electrode active materials. The negative electrode potential which is as low as the potential of a lithium metal is a factor of the high cell voltage, which is a feature of the lithium-ion battery.

Deposition of lithium on the surface of the negative electrode is a cause of a decrease in the reliability and a reduction in the capacity of the lithium-ion battery. The negative electrode potential (the electrochemical equilibrium potential of graphite) is approximately 0.2 V (vs. $Li/Li^+$), which is close to the deposition potential of lithium, 0 V (vs. $Li/Li^+$); accordingly, lithium is easily deposited on the surface of the negative electrode. The factor of the high cell voltage, which is a feature of a lithium-ion battery, is a significant cause of lithium deposition.

The above technological idea makes it possible to achieve a lithium-ion battery in which a lithium deposit (lithium metal) does not exist substantially on the surface of the negative electrode after charging.

In rapid charging, the potential of the negative electrode decreases and thus, lithium is more likely to be deposited. In a low-temperature environment, the potential of the negative electrode further decreases with an increase in the resistance of the negative electrode, and lithium becomes more likely to be deposited accordingly. However, the above technological idea enables rapid charge of a lithium-ion battery and charge of a lithium-ion battery in a low-temperature environment.

An "inversion pulse current" is used as one of the "electrical stimuli" applied to an electrode in order to, for example, inhibit deposition of a metal element or remove the deposited metal element.

One embodiment of the present invention is a power storage unit including a positive electrode including a first layer containing a positive electrode active material, a negative electrode including a second layer containing a negative electrode active material, and an electrolyte solution. A first current flowing in a first direction between the positive electrode and the negative electrode and an inversion pulse current flowing in the direction opposite to the first direction are alternately supplied to the positive electrode or the negative electrode, whereby charging or discharging is performed. The time for a single supply of the inversion pulse current is shorter than that for a single supply of the first current.

The time for the inversion pulse current supply is, for example, greater than or equal to $1/10,000$ times and less than or equal to $1/10$ times that for the first current supply. Specifically, the time for the inversion pulse current supply is, for example, longer than or equal to 0.1 seconds and shorter than or equal to 3 minutes, typically, longer than or equal to 3 seconds and shorter than or equal to 30 seconds.

The "inversion pulse current" refers to a signal that makes a current flow between a positive electrode and a negative electrode in the direction opposite to that in which a current flows between the positive electrode and the negative electrode when charging or discharging is performed (referred to as a charging current when charging is performed, and a discharging current when discharging is performed). The time for a supply of the inversion pulse current to the electrode should be shorter than the time during which the charging current or the discharging current flows after the previous supply of the inversion pulse current and is preferably sufficiently short. Therefore, the inversion "pulse" current refers not only a momentary flow of current in the direction opposite to that of a charging current or a discharging current in charging or discharging, but also a temporary flow of current in the direction opposite to that of the charging current or the discharging current for a period of time that cannot be perceived as momentary by intuition (for example, for longer than or equal to 1 second). Note that the supply of the inversion pulse current is also referred to as "inversion pulse operation".

<Formation and Removal of Dross: Mechanism 1>

First, a mechanism of dross formation on an electrode surface and a mechanism of dross removal will be described with reference to FIGS. 22A to 22F.

Note that the term "dross" refers to a reaction product generated on an electrode surface and includes in its category, a depleted substance and a deposit such as whiskers or dendrites. Dross is typically a deposit of a metal ion, and is lithium in the case of a lithium-ion battery.

The "depleted substance" refers to part of a component (e.g., an electrode or an electrolyte solution) which is modified and degraded. The "deposit" is a crystal or a solid component that is separated from a liquid substance, and can have a film shape, a particle shape, a whisker shape, or the like. The "dendrite" is a branching tree-like crystal. The "whisker" is a crystal that has grown outward from a crystal surface in a whisker shape.

FIGS. 22A to 22F are schematic cross-sectional views illustrating part of a power storage unit including at least a positive electrode, a negative electrode, and an electrolyte solution. The positive electrode includes at least a layer containing a positive electrode active material (hereinafter referred to as a positive electrode active material layer), and the negative electrode includes at least a layer containing a negative electrode active material (hereinafter referred to as a negative electrode active material layer).

FIGS. 22A to 22F illustrate only an electrode 811 and an electrolyte solution 813 in the vicinity of the electrode 811 for the sake of simplicity. The electrode 811 is the negative electrode in the following description, though the electrode 811 may be either the positive electrode or the negative electrode.

In charging, a current Ia (charging current) flows from the right to the left on FIG. 22A. An inversion pulse current Iinv flows in the direction opposite to that of the current Ia (from the left to the right on FIG. 22A). Accordingly, provided that the current Ia has a positive value, the inversion pulse current Iinv has a negative value. Note that the value (the absolute value) of the inversion pulse current Iinv is preferably equal to or higher than that of the current Ia, though one embodiment of the present invention is not limited thereto.

FIGS. 22A to 22C are schematic cross-sectional views illustrating reaction products 812a to 812c, respectively, which have abnormally grown on a surface of the electrode 811 of the power storage unit, typically, in charging.

In FIG. 22A, a current is supplied between the electrode 811 (negative electrode) and another electrode (positive electrode, not illustrated) during a period T1, and the reaction product 812a is deposited to be scattered on the electrode 811.

In FIG. 22B, a current is supplied between the negative electrode and the positive electrode during a period T2 (T2 is longer than T1). The reaction product 812a is deposited on the entire surface of the electrode and partly grows abnormally so that the reaction product 812b is formed.

In FIG. 22C, a current is supplied during a period T3 longer than the period T2. A projection of the reaction product 812c in FIG. 22C grows to be longer than a projection of the reaction product 812b in FIG. 22B in the direction perpendicular to the electrode 811. A thickness d2 of the projection of the reaction product 812c in FIG. 22C is larger than or equal to a thickness d1 of the projection of the reaction product 812b in FIG. 22B.

Dross is not uniformly deposited on the entire surface of the electrode as a current supply time passes. Once dross is deposited, dross is more likely to be deposited on the position where the dross has been deposited than on other positions, and a larger amount of dross is deposited on that position and grows to be a large lump. The region where a large amount of dross has been deposited has a higher conductivity than the other region. For this reason, current is likely to be concentrated in the region where the large amount of dross has been deposited, and the dross grows around the region faster than in the other region. Accordingly, a projection and a depression are formed by the region where a large amount of dross is deposited and the region where a small amount of dross is deposited, and the projection and the depression become larger as time passes as illustrated in FIG. 22C. Finally, the large projection and depression cause severe deterioration of the power storage unit.

After the state in FIG. 22C, a signal, a pulse voltage here, is applied so that a current flows in the direction opposite to that of the current with which the reaction product is formed, thereby dissolving the reaction product. FIG. 22D illustrates the state immediately after the application of the pulse voltage. As shown by arrows in FIG. 22D, a reaction product 812d is dissolved from its growing point. This is because the application of voltage makes the potential gradient around the growing point steep, so that the growing point is likely to be preferentially dissolved.

When an inversion pulse current is supplied after the projection and depression are formed because of non-uniform deposition of dross, the current is concentrated in the projection and the dross is dissolved. The dross dissolution means that dross in part of the electrode surface where a large amount of dross is deposited is dissolved to reduce the area where the large amount of dross is deposited, and preferably means that the electrode surface is restored to the state before dross is deposited. Note that the electrode surface is not necessarily restored to the state before dross is deposited, and a significant effect can also be obtained by a reduction of dross.

FIG. 22E illustrates a reaction product 812e which becomes smaller in the dissolution process of the reaction product 812d from its growing point.

Then, an inversion pulse current is supplied to at least one of the positive electrode and the negative electrode so as to flow in the direction opposite to that of the current with which the reaction product is formed.

When the supply of inversion pulse current is performed one or more times, ideally, the surface of the electrode 811 can be restored to the state before the reaction product is deposited as illustrated in FIG. 22F.

Even when the supply of inversion pulse current does not completely restore the surface of the electrode 811 to the initial state, it is at least possible to inhibit aggregation (increase in density) of the reaction product. This reduces the deterioration rate of the power storage unit.

Another technological idea of one embodiment of the present invention is as follows: during a period in which a current flows between the positive electrode and the negative electrode in such a direction that the reaction product is formed, an inversion pulse current is supplied more than once to make a current flow in the opposite direction. When the inversion pulse current is supplied to the reaction product, the reaction product is dissolved from its growing point into the electrolyte solution. Two or more times of supply of inversion pulse current allows inhibition of the growth of the reaction product on the electrode.

According to another embodiment of the present invention, the time for supply of an inversion pulse current in charging is shorter than the time during which a charging current flows (the time during which a reaction product is formed). Also in discharging, the time for supply of an inversion pulse current is shorter than the time during which a discharging current flows.

In the case where the reaction product is dissolved into the electrolyte solution at high speed or a small amount of reaction product is deposited, the state of FIG. 22D can be changed into the state of FIG. 22F even when the inversion pulse current is supplied for an extremely short time.

Depending on the conditions (e.g., pulse width or timing) for the supply of inversion pulse current, the state of FIG. 22D can be changed into the state of FIG. 22F even with only a single supply of inversion pulse current.

Although the electrode 811 is a negative electrode in FIGS. 22A to 22F, the same effect can be obtained even when the electrode 811 is a positive electrode. For example, in the case where a reaction product such as a decomposition product of an electrolyte solution is deposited on the positive electrode in charging, the reaction product can be removed by an inversion pulse current.

Although the case of charging is described above with reference to FIGS. 22A to 22F, also in the case of discharging, reaction products deposited on the negative electrode and the positive electrode can be removed by an inversion pulse current.

In charging the power storage unit, an inversion pulse current is supplied to at least one of the positive electrode and the negative electrode more than once so as to flow in the direction opposite to that of the current with which the reaction product is formed. Also in discharging the power storage unit, an inversion pulse current is supplied to at least one of the positive electrode and the negative electrode more than once so as to flow in the direction opposite to that of the current with which the reaction product is formed. The supply of such inversion pulse current allows prevention of deterioration of the power storage unit or repair of the power storage unit that has deteriorated.

In particular, rapid discharge is likely to occur in the acceleration of a vehicle such as a hybrid electric vehicle or an electric vehicle, which runs on the power of an electric motor. The rapid discharge tends to promote the solidification of a reaction product and degrade the power storage unit accordingly. Charge and discharge at low temperatures also promote the solidification of a reaction product. The supply of an inversion pulse current to the power storage unit included in the vehicle prevents a decrease in driving distance, acceleration performance, or the like particularly in cold climates.

Next, another mechanism of formation and removal of dross will be described.

<Formation and Removal of Dross: Mechanism 2>

FIGS. 23A to 23F illustrate a mechanism partly different from that in FIGS. 22A to 22F in the process of generation of a reaction product: the reaction product is deposited on the entire surface of an electrode and partly grows abnormally. FIGS. 23A to 23F illustrate only an electrode 821 and an electrolyte solution 823 in the vicinity of the electrode 821 for the sake of simplicity. The electrode 821 is the negative electrode in the following description, though the electrode 821 may be either the positive electrode or the negative electrode.

FIGS. 23A to 23C are schematic cross-sectional views illustrating reaction products 822a to 822c, respectively, which have abnormally grown on the surface of the electrode 821, typically, in charging, as in FIGS. 22A to 22C.

In FIG. 23A, a current is supplied between the electrode 821 (negative electrode) and another electrode (positive electrode, not illustrated) during the period T1, and the reaction product 822a is deposited on the entire surface of the electrode 821 and partly grows abnormally. Examples of a material of the electrode 821 on which the reaction product 822a is deposited include graphite, a combination of graphite and graphene oxide, and titanium oxide.

FIG. 23B illustrates the reaction product 822b which grows when a current flows between the negative electrode and the positive electrode during the period T2 (T2 is longer than T1). FIG. 23C illustrates the reaction product 822c which grows when a current flows during the period T3 longer than the period T2.

After the state in FIG. 23C, a signal is applied so that a current flows in the direction opposite to that of the current with which the reaction product is formed, thereby dissolving the reaction product. FIG. 23D illustrates the state immediately after the application of the signal, e.g., a pulse voltage, that makes a current flow in the direction opposite to that of the current with which the reaction product is formed. As shown by arrows in FIG. 23D, a reaction product 822d is dissolved from its growing point.

FIG. 23E illustrates a reaction product 822e which becomes smaller in the dissolution process of the reaction product 822d from its growing point.

As describe above, one embodiment of the present invention can be applied regardless of the process and mechanism of generation of reaction products. When the supply of inversion pulse current is performed one or more times, ideally, the electrode surface can be restored to the state before the reaction product is deposited as illustrated in FIG. 23F.

<Formation and Removal of Dross: Mechanism 3>

FIGS. 24A to 24F are different from FIGS. 22A to 22F in that a protective film is formed on an electrode surface, and a reaction product is deposited in a region that is not covered with the protective film and grows abnormally. FIGS. 24A to 24F illustrate only an electrode 831 and an electrolyte solution 833 in the vicinity of the electrode 831 for the sake of simplicity. The electrode 831 is the negative electrode in the following description, though the electrode 831 may be either the positive electrode or the negative electrode.

FIGS. 24A to 24C are schematic cross-sectional views illustrating reaction products 832a to 832c, respectively, which are formed in a region of an electrode 831, typically, a region of a surface of the electrode 831 that is not covered with a protective film 834. The protective film 834 is formed using a single layer or stacked layers of a silicon oxide film, a niobium oxide film, or an aluminum oxide film.

In FIG. 24A, a current is supplied between the electrode 831 (negative electrode) and another electrode (positive electrode, not illustrated) during the period T1, and the reaction product 832a is deposited on an exposed surface of the negative electrode 831 and grows abnormally.

FIG. 24B illustrates the reaction product 832b which grows when a current flows between the negative electrode and the positive electrode during the period T2 (T2 is longer than T1). FIG. 24C illustrates the reaction product 832c which grows when a current flows during the period T3 longer than the period T2.

After the state in FIG. 24C, a signal is applied so that a current flows in the direction opposite to that of the current with which the reaction product is formed, thereby dissolving the reaction product. FIG. 24D illustrates the state immediately after the application of the signal that makes a current flow in the direction opposite to that of the current with which the reaction product is formed. As shown by arrows in FIG. 24D, a reaction product 832d is dissolved from its growing point.

FIG. 24E illustrates a reaction product 832e which becomes smaller in the dissolution process of the reaction product 832d from its growing point. The use of the mechanism illustrated in FIGS. 24A to 24F achieves a novel electrochemical device based on an extremely novel principle.

The technological ideas disclosed in this specification are mere examples; thus, modifications and variations thereof can be regarded as being in the scope of the present invention. In addition, the technological ideas disclosed in this specification can be applied not only to vehicles but also to other moving objects such as airplanes and ships.

One embodiment of the present invention is a vehicle including an engine, an electric motor, and a power storage unit. The vehicle includes a period in which electric power generated in the electric motor from the power of the engine is supplied to the power storage unit. In the period, charging with a time tc and discharging with a time td are repeatedly performed alternately. The time td is preferably greater than or equal to 0.01% and less than or equal to 10% of the time tc. Alternatively, the time td is preferably longer than or equal to 0.1 seconds and shorter than or equal to 3 minutes.

One embodiment of the present invention is a vehicle including an electric motor, a first power storage unit, and a second storage unit. The electric motor is driven when the first power storage unit or the second power storage unit is discharged. The second power storage unit is charged during a period in which the first power storage unit is discharged. The driving of the electric motor and the charge of the second power storage unit are performed at the same time using the first power storage unit.

One embodiment of the present invention is a vehicle including an electric motor, a first power storage unit, and a second storage unit. The electric motor is driven when the first power storage unit or the second power storage unit is discharged. The driving of the electric motor by the discharge of the first power storage unit with a time td1, and the driving of the electric motor by the discharge of the second power storage unit with a time td2, are repeatedly performed alternately. The second power storage unit is charged when the electric motor is driven by the discharge of the first power storage unit. The time td1 is preferably greater than or equal to 0.01% and less than or equal to 10% of the time td2. Alternatively, the time td1 is preferably longer than or equal to 0.1 seconds and shorter than or equal to 3 minutes.

According to one embodiment of the present invention, a reaction product (dross) deposited on an electrode surface can be removed by applying a signal (inversion pulse current) that makes a current flow between a positive electrode and a negative electrode in the direction opposite to that of the current with which the reaction product is formed. Hence, according to the one embodiment of the present invention, the electrode surface that has changed can be restored to the initial state or the electrode surface can be prevented from changing, resulting in a power storage unit that does not deteriorate in principle. In other words, a maintenance-free power storage unit is achieved, which allows a device or a vehicle including the power storage unit to be used for a long time.

The technological ideas of one embodiment of the present invention, which uses the mechanism of formation of a reaction product and the mechanism of dissolution of the reaction product, enable a power storage unit that has partly deteriorated to be repaired and restored to the initial state.

One embodiment of the present invention achieves a high-mileage vehicle.

One embodiment of the present invention achieves a vehicle including a long-life power storage unit.

One embodiment of the present invention achieves a vehicle including a highly reliable power storage unit.

One embodiment of the present invention achieves a vehicle including an extremely safe power storage unit.

BRIEF DESCRIPTION OF THE DRAWINGS

In the accompanying drawings.

DETAILED DESCRIPTION OF THE INVENTION

Figure 1A:
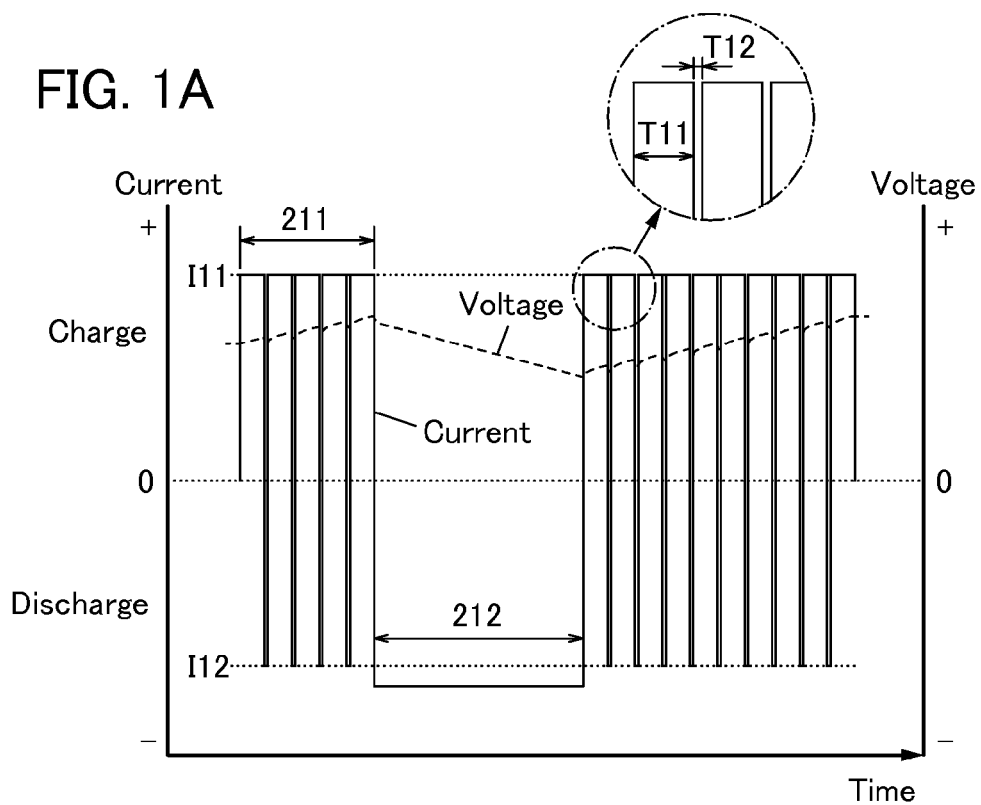
FIGS. 1A and 1B illustrate the charge and discharge of a power storage unit.

Embodiments of the present invention will be described in detail with reference to the accompanying drawings. Note that the present invention is not limited to the description below, and it is easily understood by those skilled in the art that modes and details disclosed herein can be modified in various ways. Further, the present invention is not construed as being limited to description of the embodiments.

In the structures of the present invention described below, the same portions or portions having similar functions are denoted by the same reference numerals in different drawings, and description of such portions is not repeated. The same hatch pattern is applied to parts having a similar function, and the parts are not especially denoted by reference numerals in some cases.

Note that ordinal numbers such as "first" and "second" in this specification and the like are used for convenience and do not denote the order of steps or the stacking order of layers. In addition, the ordinal numbers in this specification and the like do not denote any particular names to define the invention.

Note that a connection in this specification and the like includes an electrical connection, a functional connection, and a direct connection. A connection relation of components shown in embodiments is not limited to the connection relation illustrated in the drawings and described in the specification.

In this specification and the like, a positive electrode and a negative electrode for a secondary battery may be collectively referred to as an electrode; the electrode in this case refers to at least one of the positive electrode and the negative electrode.

Note that the content that is not specified in any drawing or text in this specification can be excluded from the invention. Alternatively, when the range of a value (e.g., the maximum and minimum values) is described, part of the range is arbitrarily shortened and part of the range is removed, whereby the invention can be specified by a range part of which is removed from the number range. In this manner, it is possible to specify the scope of the present invention so that a conventional technology is excluded, for example.

The descriptions in the embodiments for carrying out the invention can be combined with each other as appropriate.

(Embodiment 1)

Figure 3:
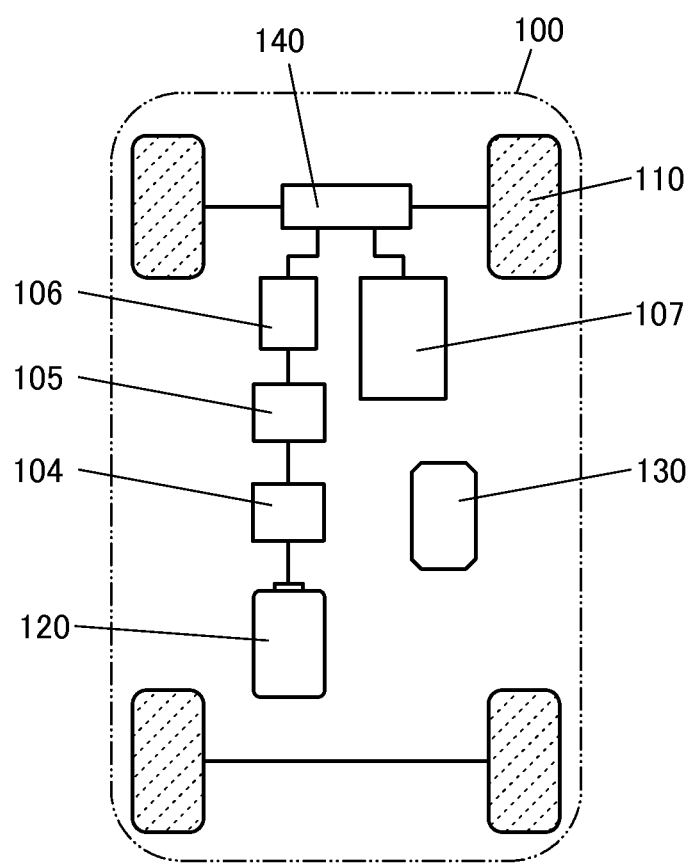
FIG. 3 illustrates a structure of a vehicle.

FIG. 3 illustrates an example of a structure of a vehicle 100 of one embodiment of the present invention. The vehicle 100 includes a power storage unit 120, a DCDC converter 104, an inverter 105, an electric motor 106, an engine 107, a power switching unit 140, and a control unit 130.

The electric motor 106 and the engine 107 are connected to wheels 110 through the power switching unit 140. The electric motor 106 and the engine 107 serve as power sources for driving the wheels 110. The power switching unit 140 has a function of selecting whether the wheels 110 are driven by the power of either or both of the electric motor 106 and the engine 107. The power switching unit 140 may include a transmission.

The electric motor 106 may be a direct-current (DC) motor or an alternate-current (AC) motor. In this embodiment, a three-phase AC motor is used as the electric motor 106. The engine 107 may be an internal combustion engine such as a gasoline engine, a diesel engine, or a gas turbine engine, or an external combustion engine such as a steam engine or a Stirling engine. In this embodiment, a gasoline engine is used as the engine 107.

The DCDC converter 104 has a function of changing the voltage of DC power input thereto. For example, a step-up/down converter can be used as the DCDC converter 104. The step-up/down converter includes a switching regulator and a control circuit, for example. The switching regulator includes at least an inductor, a first switch, and a second switch, for example. In the step-up/down converter, the control of the first and second switches using the control unit 130 switches an input voltage between the step-up and the step-down and controls the value of a raised or lowered voltage. In addition, the direction of the current flowing through the inductor is changed to reverse the input voltage and the output voltage so as to change the direction of the current in the DCDC converter 104. As a result, it is possible to switch between charging and discharging of the power storage unit 120. For example, a single ended primary inductor converter (SEPIC) or a Zeta converter can be used as the step-up/down converter.

In the inverter 105, DC power input thereto is converted into three-phase AC power, and the voltage, current, and frequency of the obtained AC power are adjusted to be output to the electric motor 106. Also in the inverter 105, AC power input thereto can be converted into DC power.

The electric motor 106 produces power from electric power applied from the power storage unit 120 through the DCDC converter 104 and the inverter 105. The electric motor 106 can serve as an electric generator. For example, electric power can be produced when the electric motor 106 is driven by the engine 107.

The moving vehicle 100 generally decelerates when a brake unit applies a load to the wheels 110 to convert kinetic energy into thermal energy. If the electric motor 106 is used as a load when the vehicle 100 decelerates, part of the kinetic energy that is to be lost as the thermal energy can be converted into electric power to be regenerated.

Specifically, velocity energy is converted into AC power by the electric motor 106 which is a three-phase AC motor in this embodiment. The AC power is converted into DC power by the inverter 105 to be input to the DCDC converter 104. The DC power input to the DCDC converter 104 is converted into a voltage suitable for charging the power storage unit 120 and can be supplied to the power storage unit 120.

The following can be used as the power storage unit 120, for example: a secondary battery such as a lithium-ion secondary battery, a lead storage battery, a lithium-ion polymer secondary battery, a nickel hydrogen storage battery, a nickel cadmium storage battery, a nickel iron storage battery, a nickel zinc storage battery, or a zinc-silver oxide storage battery; a secondary flow battery such as a redox flow battery, a zinc chlorine battery, or a zinc bromine battery; a mechanically rechargeable secondary battery such as an aluminum-air battery, a zinc-air battery, or an iron-air battery; or a high temperature operation type secondary battery such as a sodium-sulfur battery or a lithium-iron sulfide battery. Note that without being limited to these, a lithium-ion capacitor may be used as the power storage unit 120, for example.

The control unit 130 has a function of monitoring the power storage unit 120, the DCDC converter 104, the inverter 105, the electric motor 106, the engine 107, and the power switching unit 140, and generating and outputting a signal to operate these components, thereby controlling the operation thereof. For example, the control unit 130 can monitor a voltage between a positive electrode and a negative electrode of the power storage unit 120 (hereinafter, also simply referred to as a "voltage of the power storage unit 120"), or a current flowing between the positive electrode and the negative electrode of the power storage unit 120 (hereinafter, also simply referred to as a "current of the power storage unit 120"). The control unit 130 can also control the direction of the input/output of the DCDC converter 104 to determine the output voltage.

The control unit 130 includes a microcomputer, a microprocessor (MPU), a micro control unit (MCU), a field programmable gate array (FPGA), or the like.

Note that the control unit 130 preferably includes a semiconductor element using an oxide semiconductor. For example, a transistor using an oxide semiconductor for a semiconductor layer including a channel has an extremely low off-state current. The control unit 130 consumes less power if including such a transistor using an oxide semiconductor for a semiconductor layer including a channel.

A semiconductor element using an oxide semiconductor can be used not only for the control unit 130 but also for another semiconductor device such as the inverter 105 or the DCDC converter 104, in which case the semiconductor device consumes less power.

Next, the charge and discharge of the power storage unit 120 included in the vehicle 100 will be described with reference to FIGS. 1A and 1B and FIGS. 2A and 2B. FIGS. 1A and 1B and FIGS. 2A and 2B show changes over time in the current and voltage of the power storage unit 120. Thus, the horizontal axis represents time and the vertical axis represents current and voltage. In FIGS. 1A and 1B and FIGS. 2A and 2B, a current between the positive electrode and the negative electrode of the power storage unit in charging (hereinafter, also referred to as a "charging current") flows in the positive direction, whereas a current in discharging (hereinafter, also referred to as a "discharging current") flows in the negative direction.

During a period 211, the wheels 110 are driven by the engine 107. During the period 211, part of the power of the engine 107 is input to the electric motor 106 so that the electric motor 106 produces electric power and then, the electric power can be supplied to the power storage unit 120. Hence, the period 211 can also be referred to as a charging period of the power storage unit 120 (hereinafter, also referred to as a "charging period").

During a period 212, the wheels 110 are driven by the electric motor 106. The electric motor 106 produces power from the electric power applied from the power storage unit 120, and thus can drive the wheels 110. Hence, the period 212 can also be referred to as a discharging period of the power storage unit 120 (hereinafter, also referred to as a "discharging period").

Figure 2A:
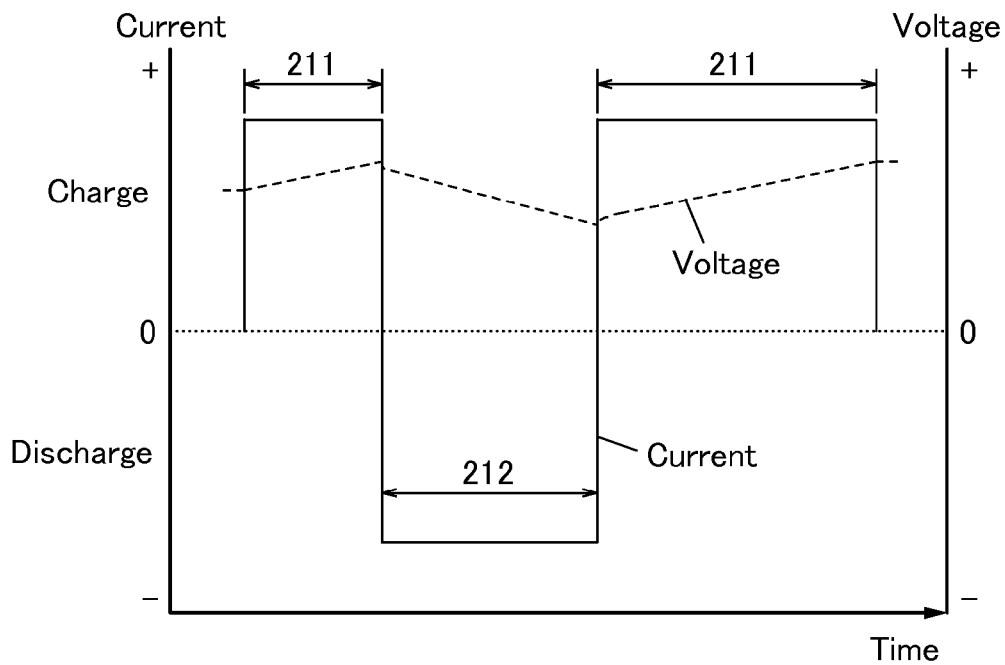
FIGS. 2A and 2B illustrate the charge and discharge of a power storage unit.
Figure 2B:
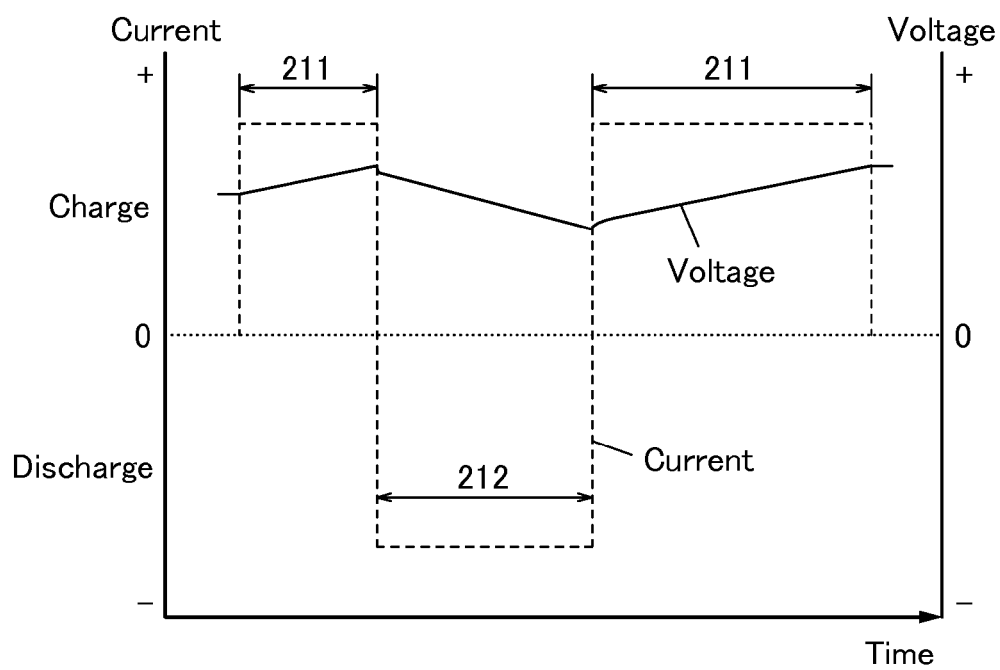

FIGS. 2A and 2B show changes in the current and voltage of the power storage unit 120 in the periods 211 and 212. Note that for easy viewing, FIGS. 2A and 2B show the same graph: in FIG. 2A, a current and a voltage are denoted by a solid line and a dashed line, respectively; and in FIG. 2B, a current and a voltage are denoted by a dashed line and a solid line, respectively.

During the period 211, the electric power generated from the power of the engine 107 is supplied to the power storage unit 120. In that case, a positive current (charging current) continues to flow in the power storage unit 120. As the charging proceeds, the voltage of the power storage unit 120 increases.

During the period 212, the power storage unit 120 is discharged to apply the electric power to the electric motor 106; therefore, a negative current (discharging current) continues to flow in the power storage unit 120. As the discharging proceeds, the voltage of the power storage unit 120 decreases.

Figure 1B:
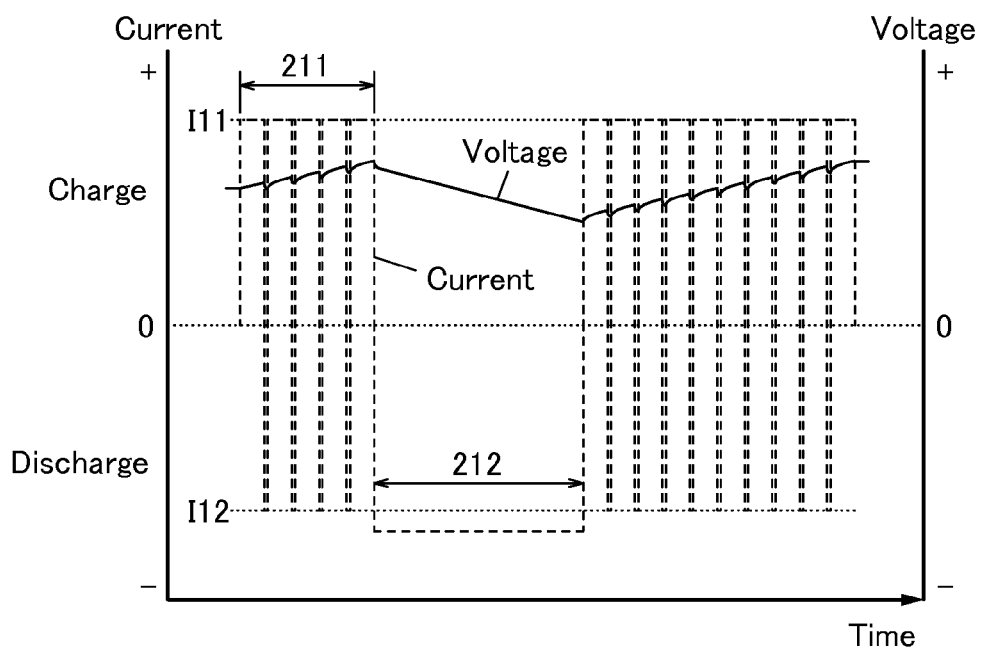

FIGS. 1A and 1B show an example of the inversion pulse operation of the power storage unit 120. Note that for easy viewing, FIGS. 1A and 1B show the same graph: in FIG. 1A, a current and a voltage are denoted by a solid line and a dashed line, respectively; and in FIG. 1B, a current and a voltage are denoted by a dashed line and a solid line, respectively.

As illustrated in FIGS. 1A and 1B, the inversion pulse operation is preferably performed more than once during the charging period of the power storage unit 120. During a period T11, the power storage unit 120 is supplied with a positive current I11 to be charged, whereas during a period T12, the power storage unit 120 is supplied with a negative current I12 to be discharged.

In FIGS. 1A and 1B, the period T12 is preferably shorter than the period T11, in which case the amount of charge to be charged is larger than that of charge to be discharged, and thus the charging time does not need to be extended. The period T12 is, for example, greater than or equal to 0.01% and less than or equal to 10% of the period T12. Specifically, the period T12 is longer than or equal to 0.1 seconds and shorter than or equal to 3 minutes, typically, longer than or equal to 3 seconds and shorter than or equal to 30 seconds.

The period T12 allows removal of a reaction product deposited on the negative electrode and the positive electrode. It is thus possible to prevent deterioration of the power storage unit or repair the power storage unit that has deteriorated.

Note that each period T11 may have a different length in FIGS. 1A and 1B. For example, the lengths of the periods T11 may be increased gradually, or reduced gradually.

Each period T12 may have a different length in FIGS. 1A and 1B. For example, the lengths of the periods T12 may be reduced gradually, or increased gradually.

In each period T11 shown in FIGS. 1A and 1B, the current I11 may have a different value. For example, in the periods T11, the values of the currents I11 may be increased gradually, or reduced gradually.

In each period T12 shown in FIGS. 1A and 1B, the current I12 may have a different value. For example, in the periods T12, the values of the currents I12 may be increased gradually, or reduced gradually.

Note that the aforementioned charging methods may be combined as appropriate.

(Embodiment 2)

Figure 4:
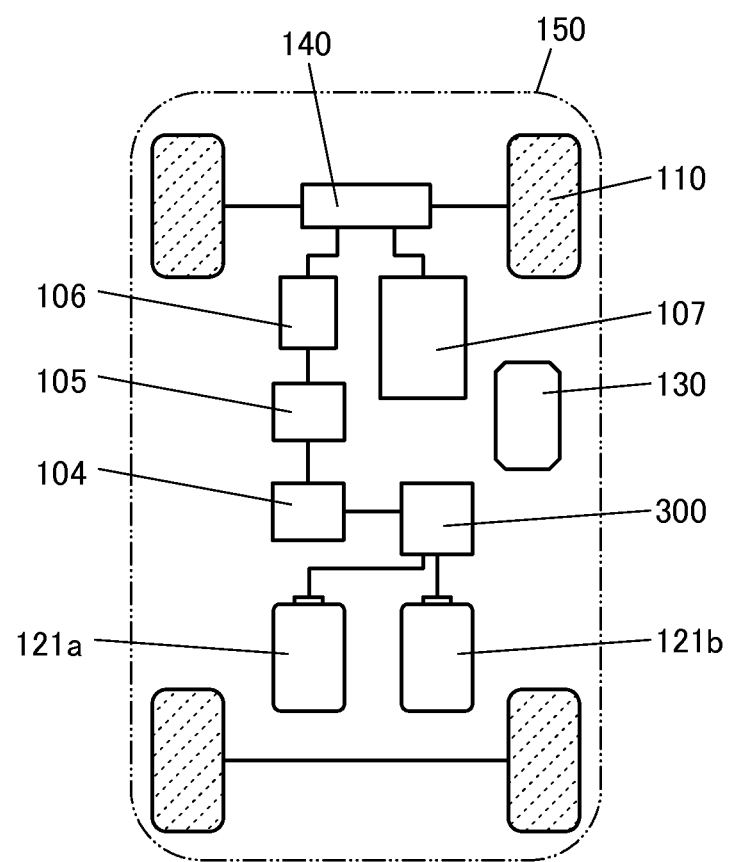
FIG. 4 illustrates a structure of a vehicle.

FIG. 4 illustrates an example of a structure of a vehicle 150 of one embodiment of the present invention. The vehicle 150 has a structure in which another power storage unit and a charge and discharge control device 300 are added to the vehicle 100 shown in Embodiment 1.

The vehicle 150 shown in this embodiment includes a first power storage unit 121a and a second power storage unit 121b. When the plurality of power storage units are provided and the charge and discharge of the power storage units are controlled by the charge and discharge control device 300, inversion pulse operation can be performed in the discharging period as well as in the charging period.

Figure 5A:
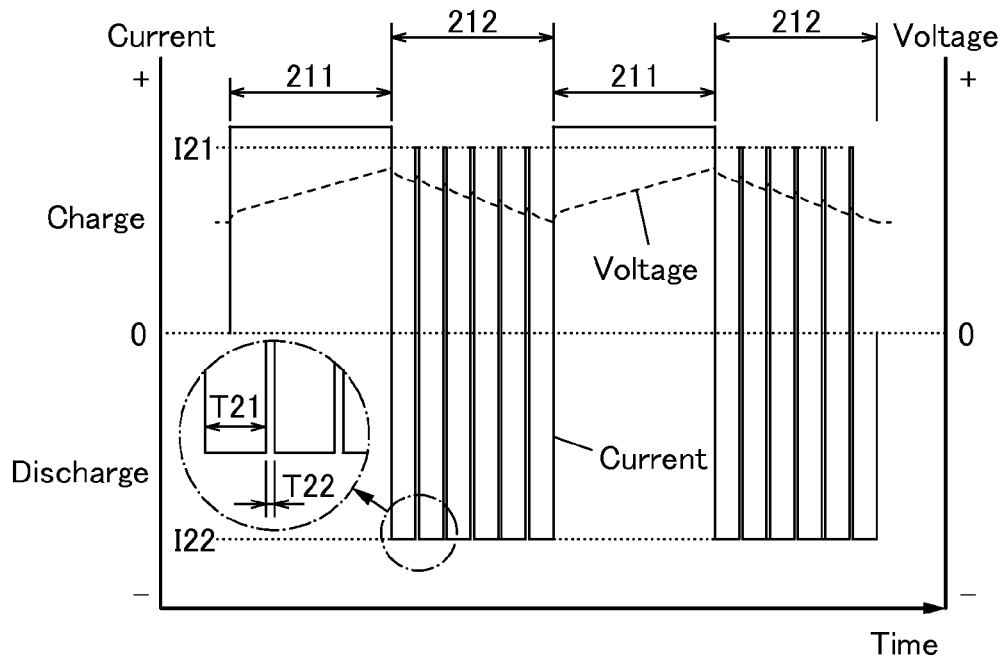
FIGS. 5A and 5B illustrate the discharge of a power storage unit.
Figure 5B:
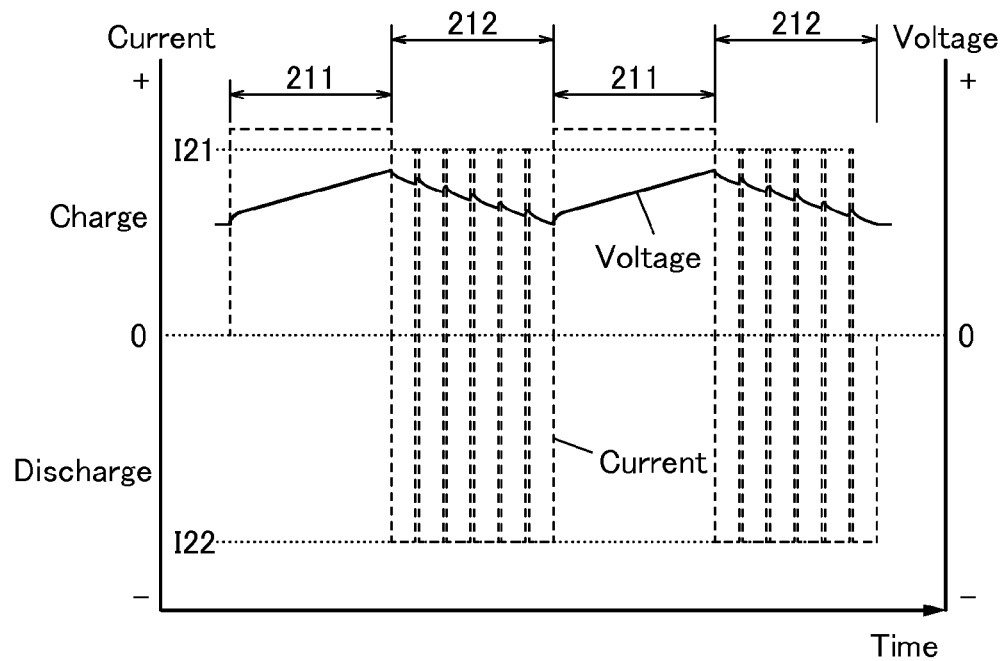

FIGS. 5A and 5B show an example of the inversion pulse operation. The inversion pulse operation is performed during a period (discharging period) in which the electric motor 106 is driven by one of the first and second power storage units 121a and 121b. Note that for easy viewing, FIGS. 5A and 5B show the same graph: in FIG. 5A, a current and a voltage are denoted by a solid line and a dashed line, respectively; and in FIG. 5B, a current and a voltage are denoted by a dashed line and a solid line, respectively.

As illustrated in FIGS. 5A and 5B, the inversion pulse operation is preferably performed more than once during the discharging period. During a period T21, the power storage unit 120 is supplied with a negative current I22 to be discharged, whereas during a period T22, the power storage unit 120 is supplied with a positive current I21 to be charged.

In FIGS. 5A and 5B, the period T22 is preferably shorter than the period T21. The period T22 is, for example, greater than or equal to 0.01% and less than or equal to 10% of the period T21. Specifically, the period T22 is longer than or equal to 0.1 seconds and shorter than or equal to 3 minutes, typically, longer than or equal to 3 seconds and shorter than or equal to 30 seconds.

The period T22 allows removal of a reaction product deposited on the negative electrode and the positive electrode. It is thus possible to prevent deterioration of the power storage unit or repair the power storage unit that has deteriorated.

Note that the length of each period T21 may be changed in FIGS. 5A and 5B. For example, the length of each period T21 may be increased gradually, or reduced gradually.

The length of each period T22 may be changed in FIGS. 5A and 5B. For example, the length of each period T22 may be reduced gradually, or increased gradually.

In each period T21 shown in FIGS. 5A and 5B, the value of the current I21 may be changed. For example, in each period T21, the value of the current I21 may be increased gradually, or reduced gradually.

In each period T22 shown in FIGS. 5A and 5B, the value of the current I22 may be changed. For example, in each period T22, the value of the current I22 may be increased gradually, or reduced gradually.

Note that the aforementioned charging methods may be combined as appropriate.

Figure 6A:
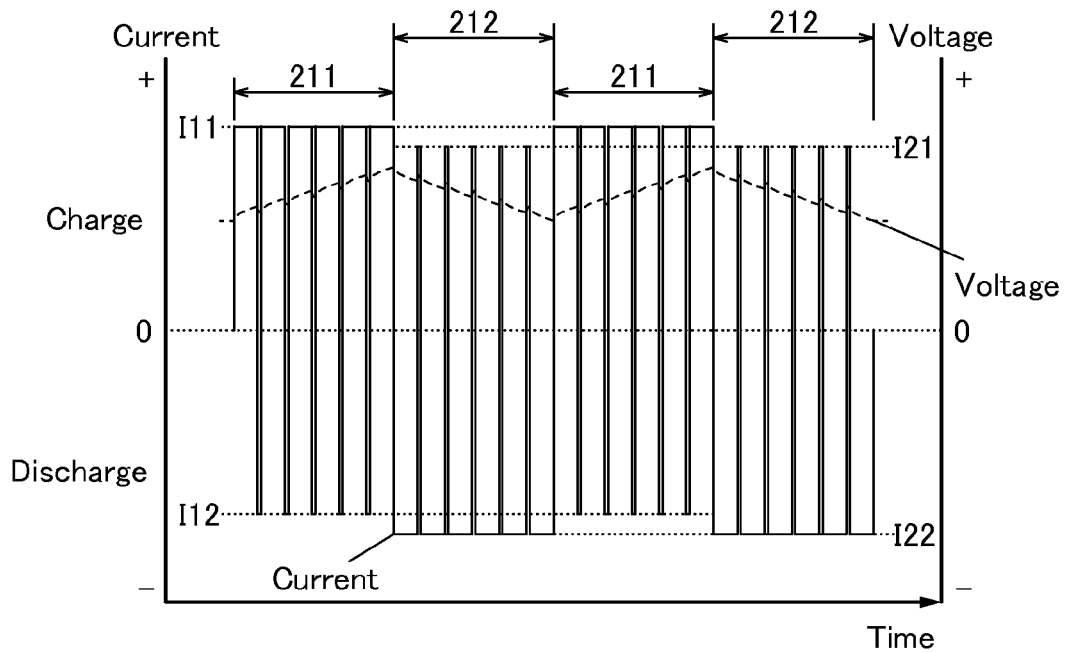
FIGS. 6A and 6B illustrate the charge and discharge of a power storage unit.
Figure 6B:
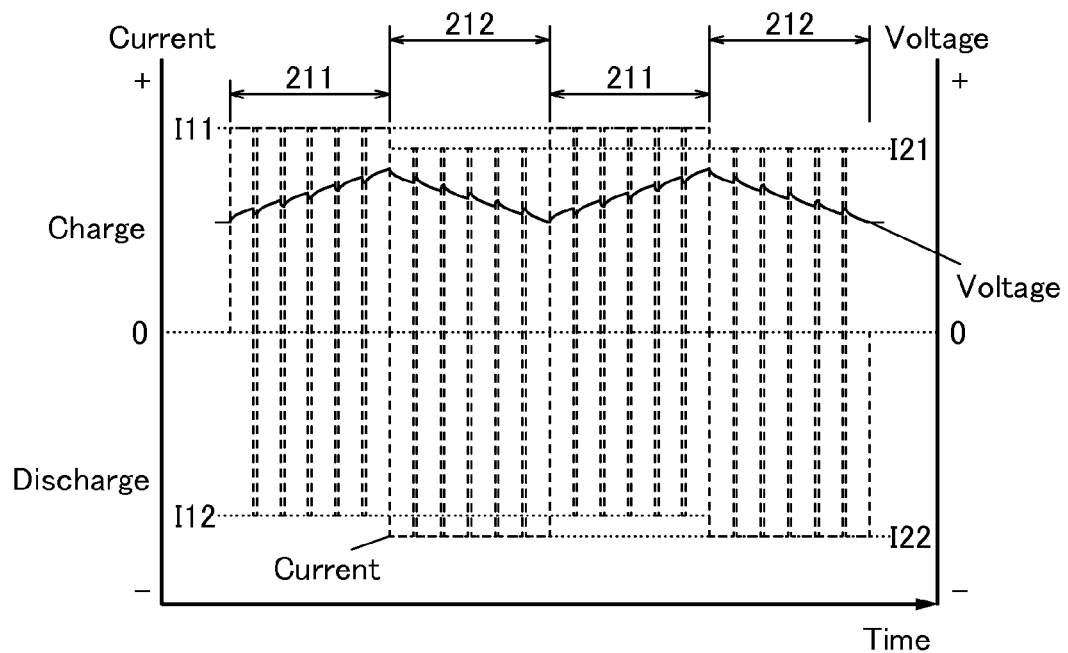

Note that the inversion pulse operation may be performed both in the charging and discharging periods, and such an example is shown in FIGS. 6A and 6B. Note that for easy viewing, FIGS. 6A and 6B show the same graph: in FIG. 6A, a current and a voltage are denoted by a solid line and a dashed line, respectively; and in FIG. 6B, a current and a voltage are denoted by a dashed line and a solid line, respectively. The inversion pulse operation in the charging period and the discharging period is described in the above; therefore, the repeated description thereof is omitted here.

The inversion pulse operation both in the charging and discharging periods increases the effect of removal of a reaction product deposited on the negative electrode and the positive electrode. This makes it possible to more effectively prevent deterioration of the power storage unit or repair the power storage unit that has deteriorated.

Next, examples of the structure and operation of the charge and discharge control device 300 will be described with reference to FIG. 7 to FIG. 14 and FIGS. 15A and 15B.

Figure 7:
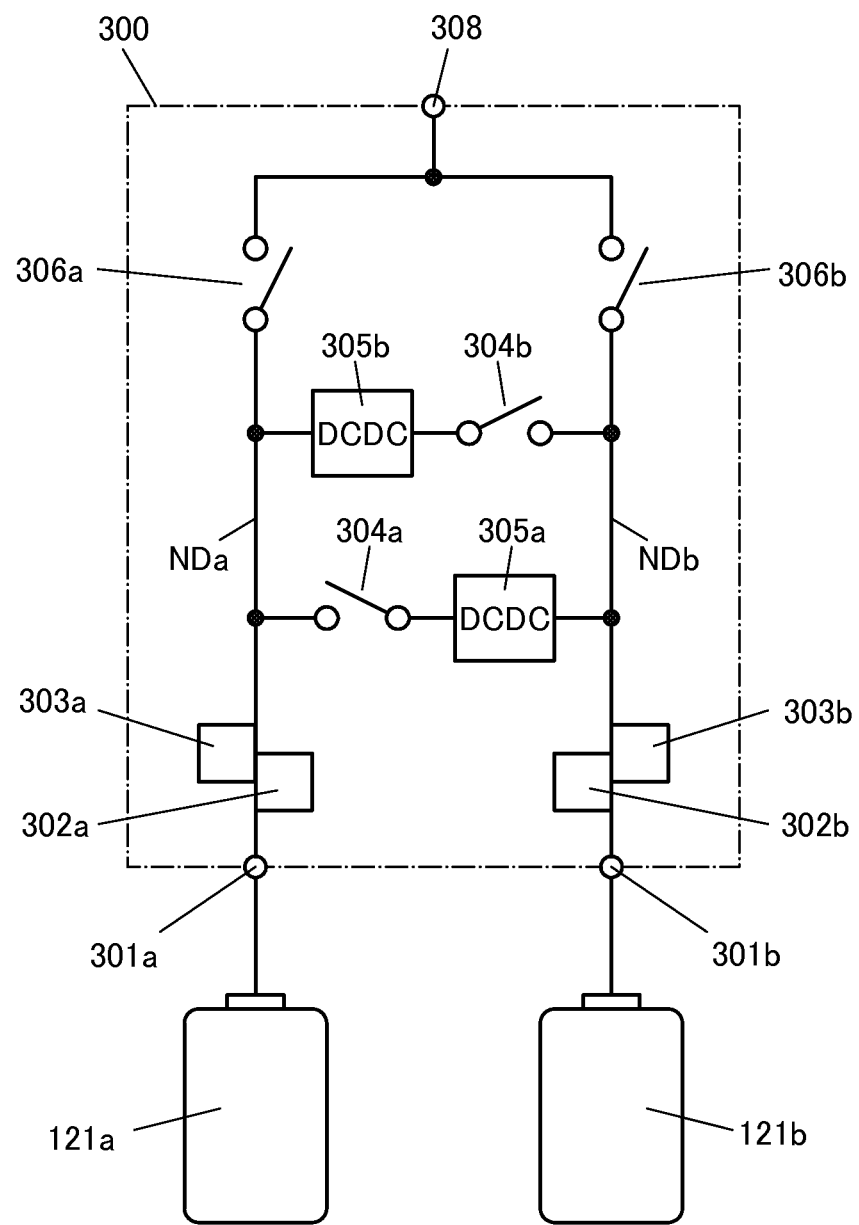
FIG. 7 illustrates a structure of a charge and discharge control device.

FIG. 7 illustrates an example of the structure of the charge and discharge control device 300 which includes a first terminal 301*a*, a second terminal 301*b*, and a terminal 308. The charge and discharge control device 300 also includes a first voltage sensor 302*a*, a first current sensor 303*a*, a second voltage sensor 302*b*, and a second current sensor 303*b*. Further, the charge and discharge control device 300 includes a first DCDC converter 305*a*, a second DCDC converter 305*b*, a switch 304*a*, a switch 304*b*, a switch 306*a*, and a switch 306*b*.

The first terminal 301*a* is connected to a node NDa through the first voltage sensor 302*a* or the first current sensor 303*a*. The second terminal 301*b* is connected to a node NDb through the second voltage sensor 302*b* or the second current sensor 303*b*.

The first DCDC converter 305*a* includes at least a first terminal and a second terminal (not illustrated). The second DCDC converter 305*b* includes at least a first terminal and a second terminal (not illustrated).

One terminal of the switch 304*a* is connected to the node NDa, and the other terminal of the switch 304*a* is connected to the first terminal of the first DCDC converter 305*a*. The second terminal of the first DCDC converter 305*a* is connected to the node NDb.

One terminal of the switch 304*b* is connected to the node NDb, and the other terminal of the switch 304*b* is connected to the first terminal of the second DCDC converter 305*b*. The second terminal of the second DCDC converter 305*b* is connected to the node NDa.

One terminal of the switch 306*a* is connected to the node NDa, and the other terminal of the switch 306*a* is connected to the terminal 308. One terminal of the switch 306*b* is connected to the node NDb, and the other terminal of the switch 306*b* is connected to the terminal 308.

The first voltage sensor 302*a* can measure the voltage between the positive electrode and the negative electrode of the first power storage unit 121*a* connected to the first terminal 301*a* (hereinafter, also simply referred to as the "voltage of the first power storage unit 121*a*"). The first current sensor 303*a* can measure the current flowing between the positive electrode and the negative electrode of the first power storage unit 121*a* connected to the first terminal 301*a* (hereinafter, also simply referred to as the "current of the first power storage unit 121*a*").

The second voltage sensor 302*b* can measure the voltage between the positive electrode and the negative electrode of the second power storage unit 121*b* connected to the second terminal 301*b* (hereinafter, also simply referred to as the "voltage of the second power storage unit 121*b*"). The second current sensor 303*b* can measure the current flowing between the positive electrode and the negative electrode of the second power storage unit 121*b* connected to the second terminal 301*b* (hereinafter, also simply referred to as the "current of the second power storage unit 121*b*").

The first DCDC converter 305*a* and the second DCDC converter 305*b* have a function of changing the voltage of DC power input thereto into a given voltage and outputting the voltage.

In the charge and discharge control device 300, the terminal 308 can be electrically connected to the first terminal 301*a* when the switch 306*a* is brought into the on state (conductive state). In the case where the voltage of the terminal 308 is higher than that of the first power storage unit 121*a*, the first power storage unit 121*a* is charged. In the case where the voltage of the terminal 308 is lower than that of the first power storage unit 121*a*, the first power storage unit 121*a* is discharged. In that case, the switches 306*b*, 304*a*, and 304*b* are preferably in the off state (insulating state) because the first power storage unit 121*a* is charged or discharged effectively (see FIG. 8).

Also in the charge and discharge control device 300, the terminal 308 can be electrically connected to the second terminal 301*b* when the switch 306*b* is brought into the on state (conductive state). In the case where the voltage of the terminal 308 is higher than that of the second power storage unit 121*b*, the second power storage unit 121*b* is charged. In the case where the voltage of the terminal 308 is lower than that of the second power storage unit 121*b*, the second power storage unit 121*b* is discharged. In that case, the switches 306*a*, 304*a*, and 304*b* are preferably in the off state (insulating state), so that the second power storage unit 121*b* is charged or discharged effectively (see FIG. 9).

Next, description is made on an example of the operation of the charge and discharge control device 300 in the case where discharging is performed in the charging period (period 211). Described here is an example of the operation in which the first power storage unit 121*a* is discharged in the charging period of the first power storage unit 121*a*.

Figure 11:
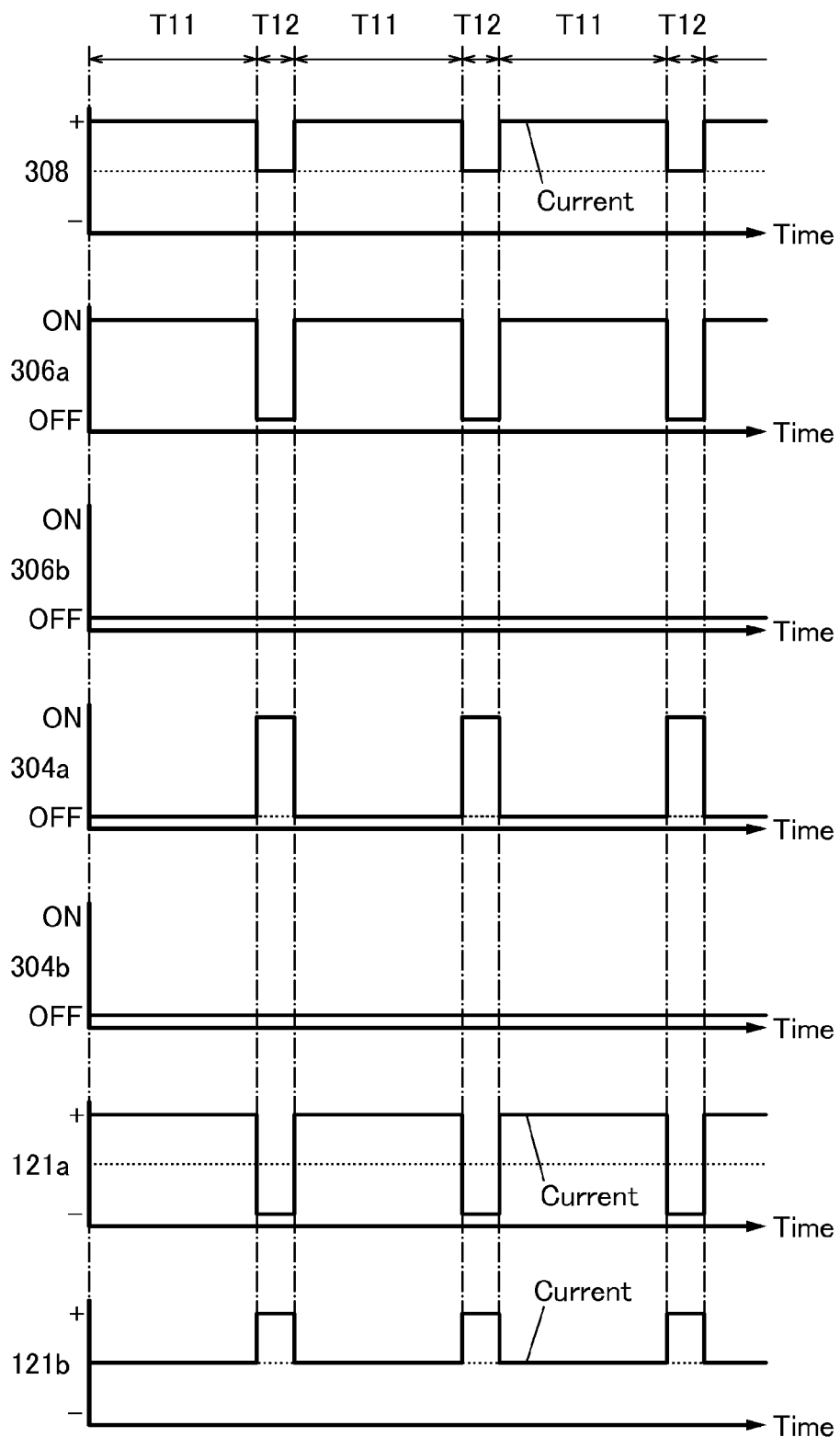
FIG. 11 illustrates the operation of the charge and discharge control device.

FIG. 11 shows the operation of the components in the charge and discharge control device 300 during the charging period. Specifically, FIG. 11 shows changes over time in the current flowing through the terminal 308, the states of the switches 306*a*, 306*b*, 304*a*, and 304*b*, and the currents of the first power storage units 121*a* and 121*b*. The horizontal axis represents time. In FIG. 11, inversion pulse operation is performed in the charging period. Note that the positive current flowing through the terminal 308 represents a current flowing into the charge and discharge control device 300 from outside, whereas the negative current represents a current flowing from the charge and discharge control device 300 to the outside.

Figure 8:
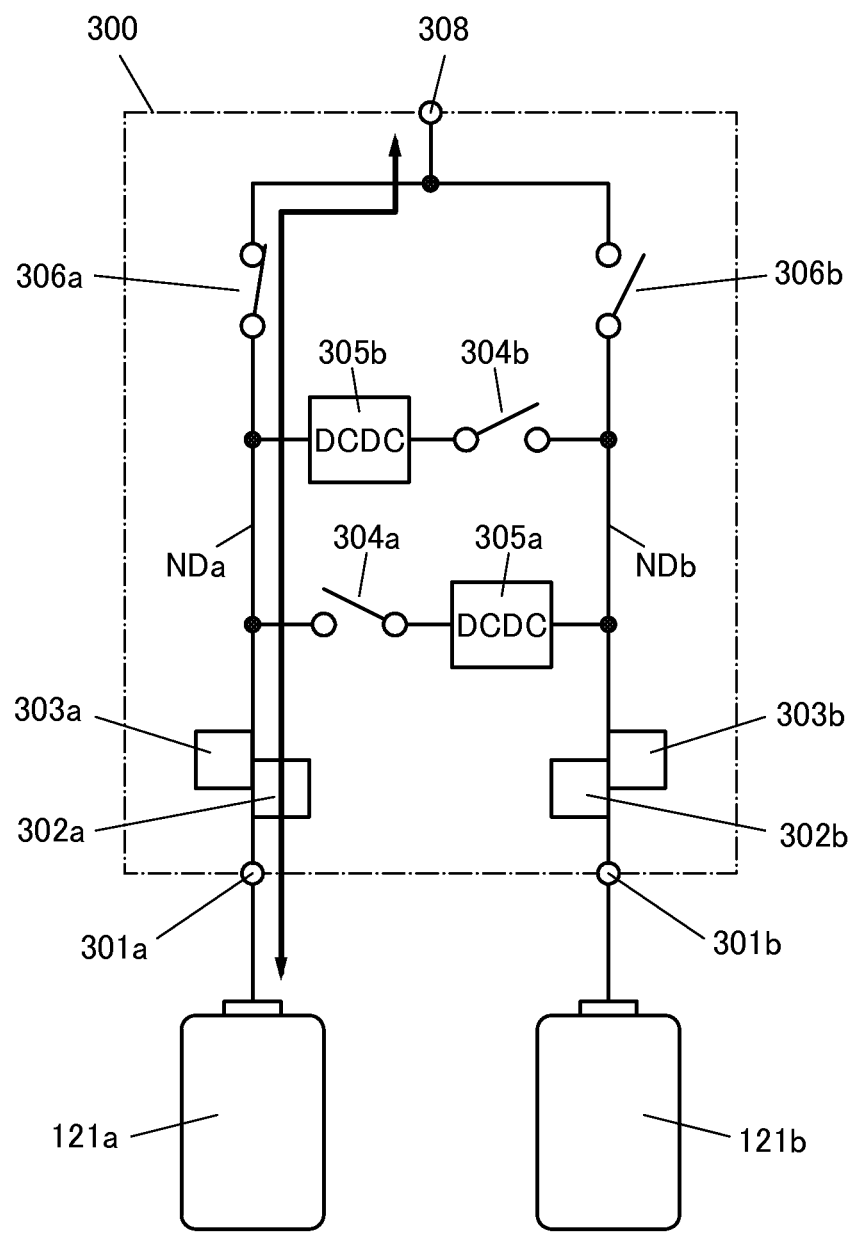
FIG. 8 illustrates the operation of the charge and discharge control device.
Figure 9:
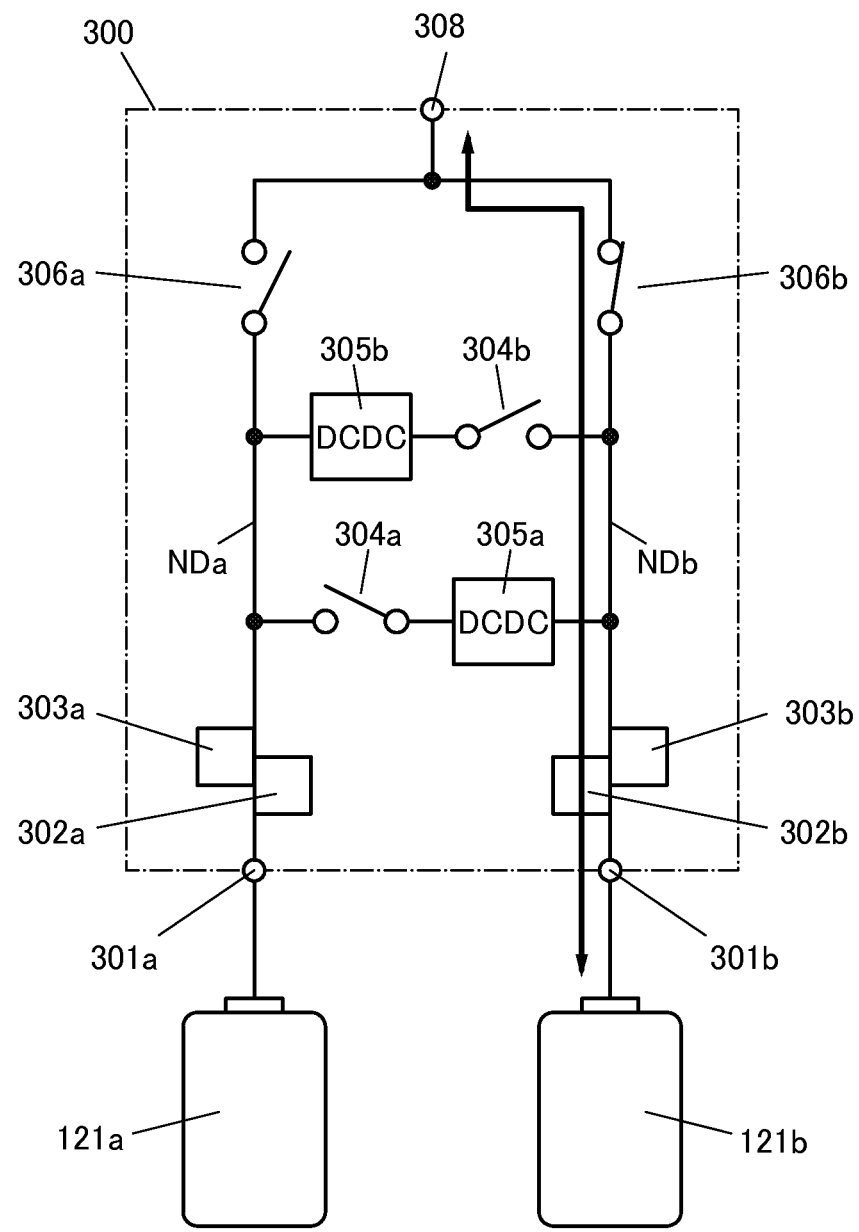
FIG. 9 illustrates the operation of the charge and discharge control device.

In the period T11, the charge and discharge control device 300 operates as shown in FIG. 8 so that the voltage of the terminal 308 becomes higher than that of the first power storage unit 121*a*. As a result, the first power storage unit 121*a* is charged and the positive current flows through the terminal 308.

Figure 10:
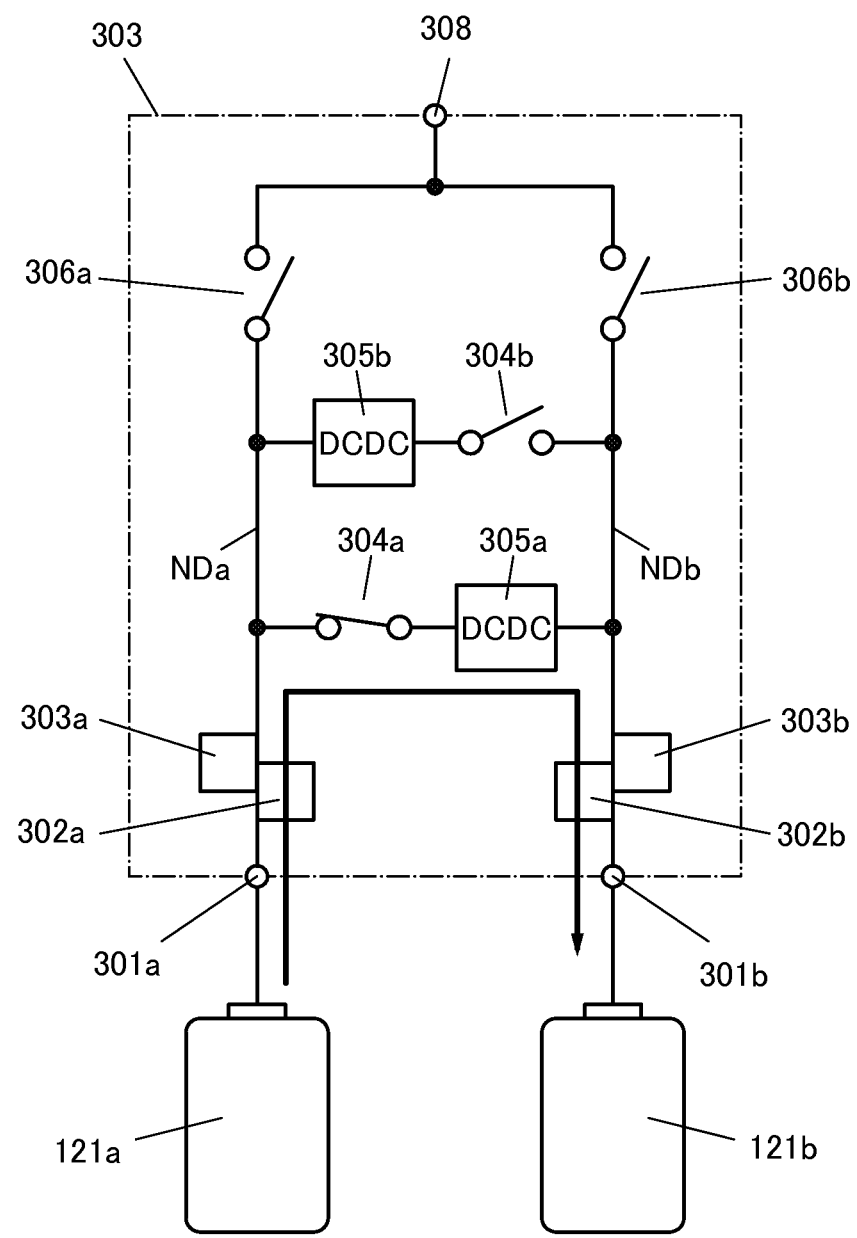
FIG. 10 illustrates the operation of the charge and discharge control device.

As illustrated in FIG. 10, during the period T12 in which the first power storage unit 121*a* is discharged, the switches 306a, 306b, and 304b are turned off. Then, the switch 304a is turned on, so that the electric power of the first power storage unit 121a is supplied to the first terminal of the first DCDC converter 305a. The DC power applied from the first power storage unit 121a to the first DCDC converter 305a is converted into power with a voltage higher than that of the second power storage unit 121b and output from the first DCDC converter 305a.

Thus, the electric power output from the first power storage unit 121a in discharging can be supplied to the second power storage unit 121b. The first DCDC converter 305a and the second power storage unit 121b are used as a load for discharging the first power storage unit 121a, whereby the electric power output from the first power storage unit 121a in discharging can be transferred to the second power storage unit 121b.

In the case where the second power storage unit 121b is discharged (period T12) in the charging period of the second power storage unit 121b, the switch 304a is turned off and the switch 304b is turned on. In that case, the electric power output from the second power storage unit 121b in discharging is supplied to the first power storage unit 121a through the second DCDC converter 305b.

Next, description is made on an example of the operation of the charge and discharge control device 300 in the case where charging is performed in the discharging period (period 212). For stable operation of the electric motor 106, during the discharging period, electric power needs to be constantly applied to the electric motor 106 by the first power storage unit 121a or the second power storage unit 121b. Described here is an example of the operation capable of applying electric power to the electric motor 106 constantly even when the first power storage unit 121a is charged in the discharging period of the first power storage unit 121a.

Figure 14:
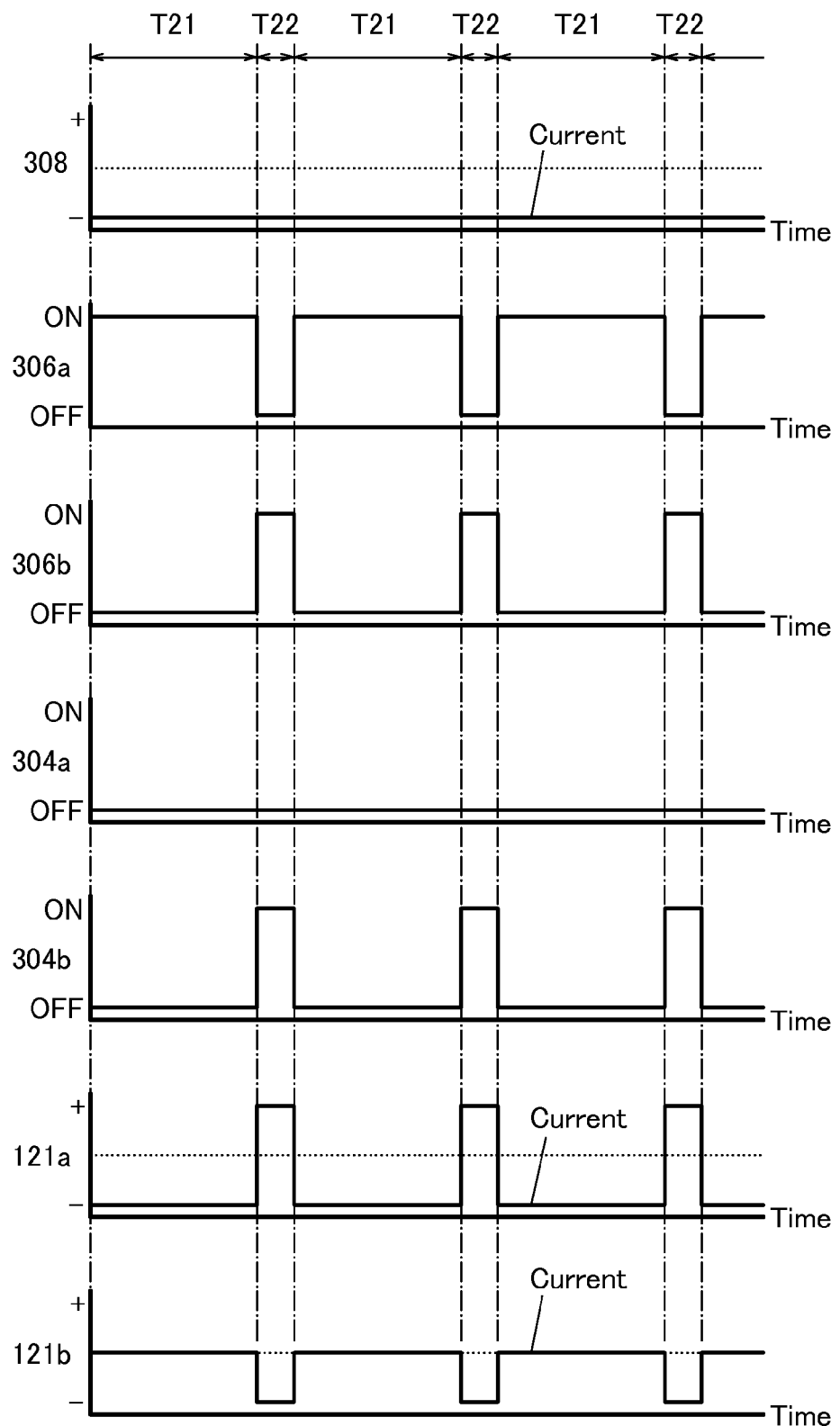
FIG. 14 illustrates the operation of the charge and discharge control device.

FIG. 14 shows the operation of the components in the charge and discharge control device 300 during the discharging period. Specifically, FIG. 14 shows changes in the current flowing through the terminal 308, the states of the switches 306a, 306b, 304a, and 304b, and the currents of the first power storage units 121a and 121b. The horizontal axis represents time. In FIG. 14, inversion pulse operation is performed in the discharging period. Note that the positive current flowing through the terminal 308 represents a current flowing into the charge and discharge control device 300 from outside, whereas the negative current represents a current flowing from the charge and discharge control device 300 to the outside.

In the period T21, the charge and discharge control device 300 operates as shown in FIG. 8 so that the voltage of the terminal 308 becomes lower than that of the first power storage unit 121a. As a result, the power storage unit 121a is discharged and the negative current flows through the terminal 308.

Figure 12:
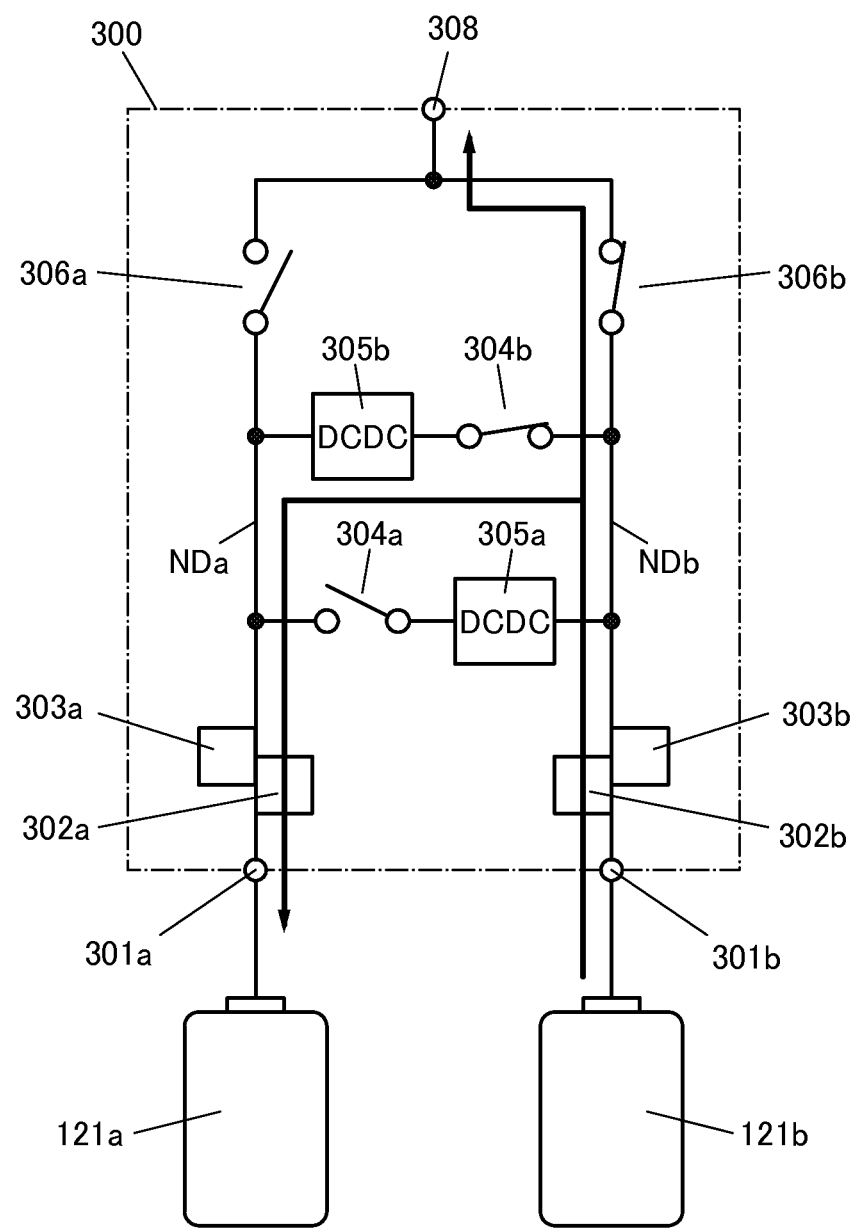
FIG. 12 illustrates the operation of the charge and discharge control device.
Figure 13:
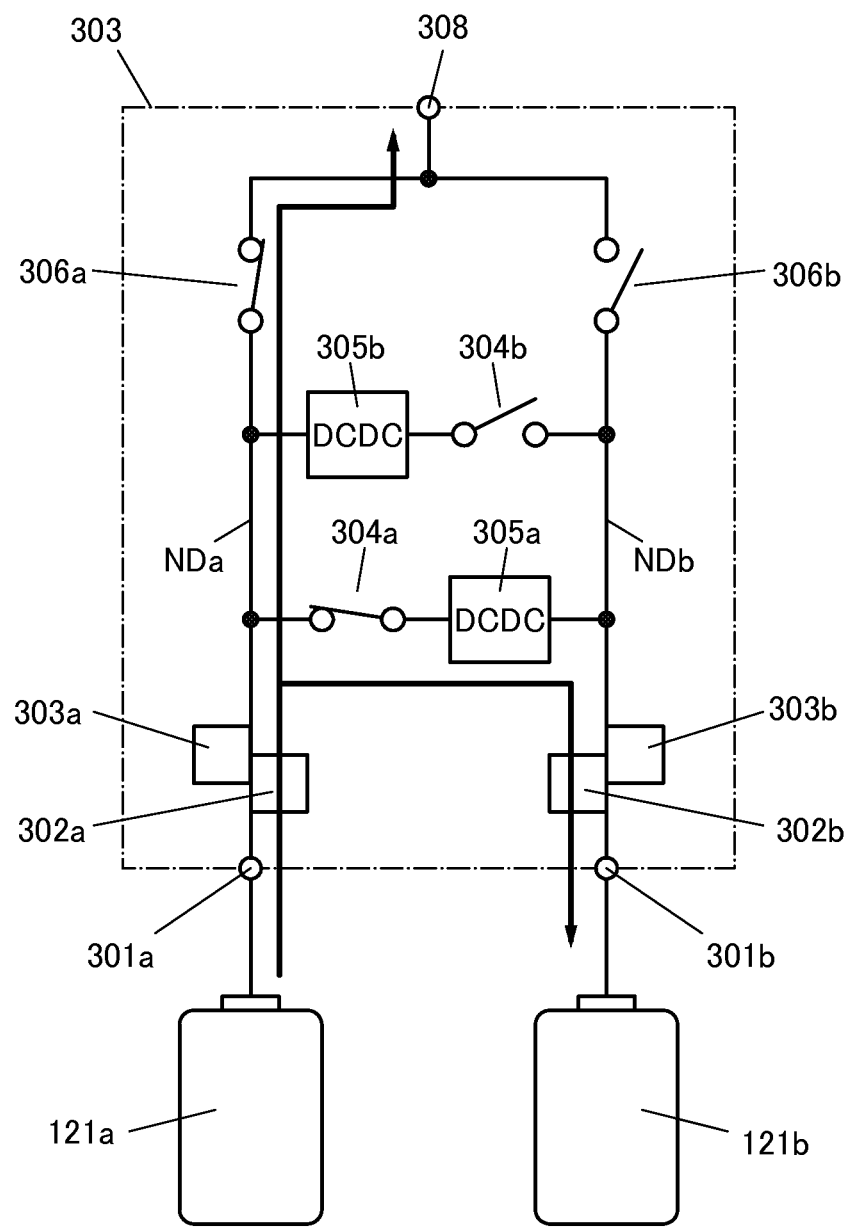
FIG. 13 illustrates the operation of the charge and discharge control device.

As illustrated in FIG. 12, during the period T22 in which charging is performed in the discharging period of the first power storage unit 121a, the switches 306a and 304b are turned off and the switches 306b and 304b are turned on. Since the switch 306a is turned off, the supply of electric power to the electric motor 106 from the first power storage unit 121a is stopped; however, since the switch 306b is turned on at the same time, electric power can be supplied to the electric motor 106 from the second power storage unit 121b. Furthermore, since the switch 304b is turned on, electric power is applied to the first terminal of the second DCDC converter 305b from the second power storage unit 121b. The electric power applied from the second power storage unit 121b to the second DCDC converter 305b is converted into power with a voltage higher than that of the first power storage unit 121a and output from the second DCDC converter 305b.

Thus, the electric power output from the second power storage unit 121b in discharging can be partly used to charge the first power storage unit 121a. Further, during the period T22 in which the first power storage unit 121a is charged, electric power is applied to the electric motor 106 by the second power storage unit 121b instead of the first power storage unit 121a, which makes it possible to supply electric power to the electric motor 106 constantly. In other words, a negative current continues to flow through the terminal 308 during the discharging period. This enables stable operation of the electric motor 106 even when charging is performed in the discharging period.

In the case where charging is performed (period T22) in the discharging period of the second power storage unit 121b, the switches 306b and 304b are turned off and the switches 306a and 304b are turned on. In that case, the electric power output from the first power storage unit 121a in discharging is partly supplied to the second power storage unit 121b through the first DCDC converter 305a (see FIG. 13).

Figure 15A:
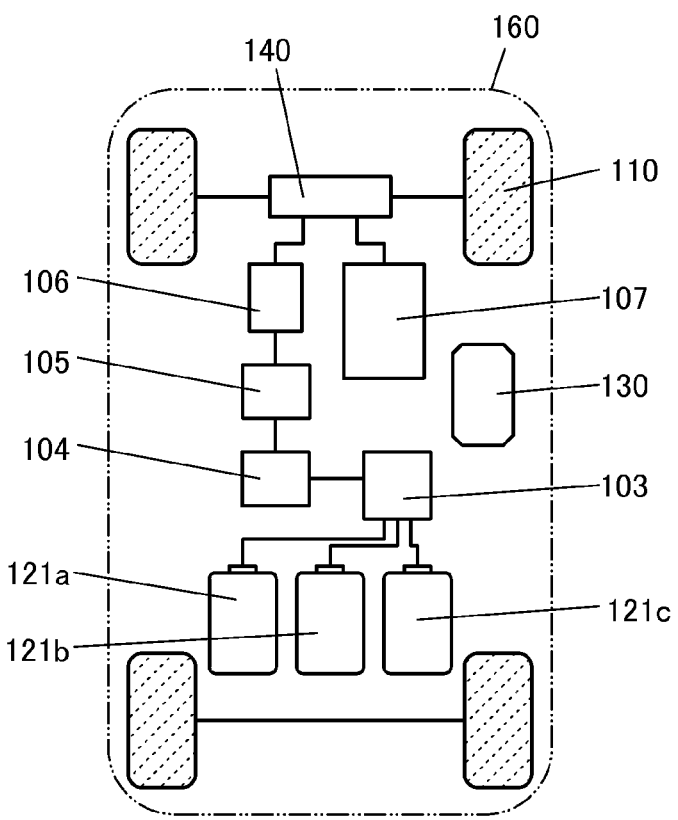
FIGS. 15A and 15B each illustrate a structure of a vehicle.
Figure 15B:
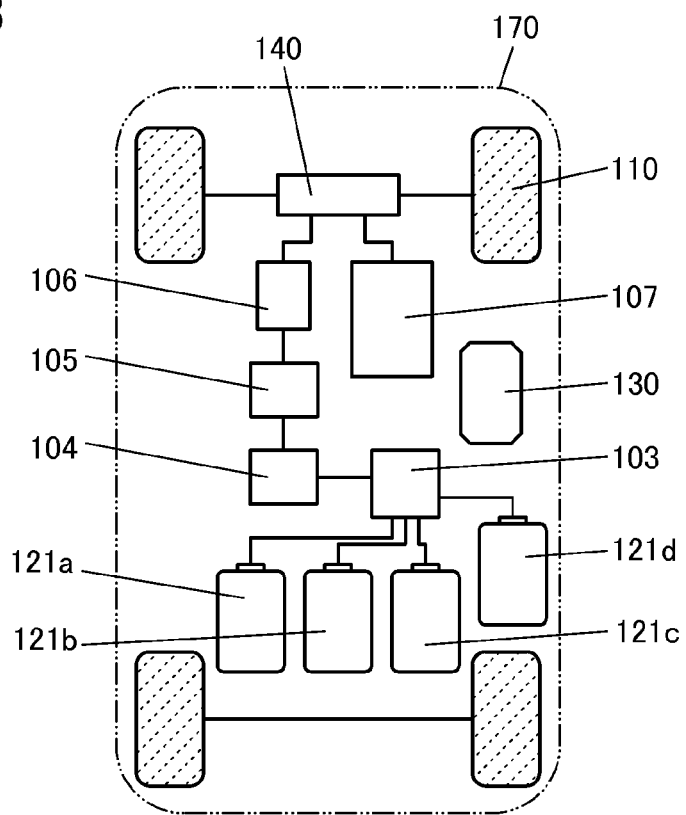

Although this embodiment shows an example of the structure of the vehicle 150 including the two power storage units, the vehicle may include three or more power storage units. FIG. 15A illustrates an example of a structure of a vehicle 160 including the first power storage unit 121a, the second power storage unit 121b, and a third power storage unit 121c. FIG. 15B illustrates an example of a structure of a vehicle 170 including the first power storage unit 121a, the second power storage unit 121b, the third power storage unit 121c, and a fourth power storage unit 121d. When a plurality of power storage units are provided in the vehicle, the power storage units used in the charging period and the discharging period can be replaced one another; for example, can be used in rotation. This results in a longer lifetime of the power storage units. When the power storage units are connected in parallel, the electric motor 106 can drive the vehicle a longer distance. When the power storage units are connected in series, the output voltage of the power storage units can be increased.

(Embodiment 3)

As an example of the power storage unit, a nonaqueous secondary battery typified by a lithium-ion secondary battery will be described.

[1. Positive Electrode]

Figure 16A:
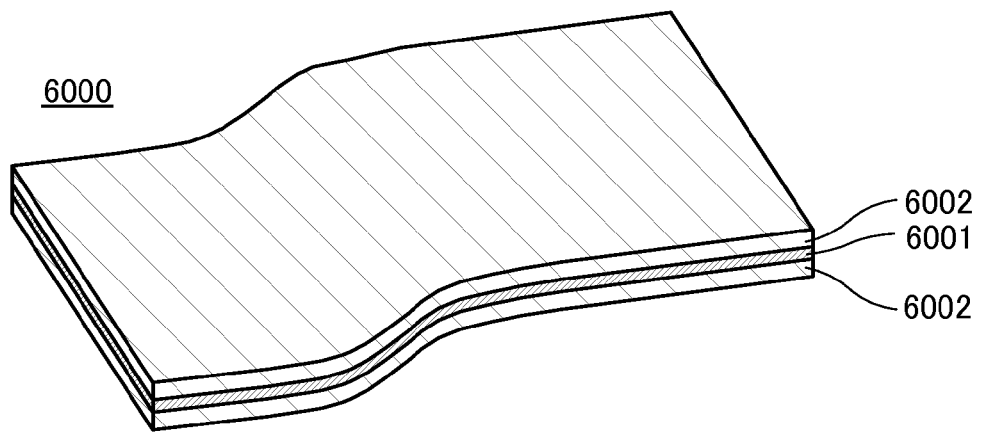
FIGS. 16A and 16B illustrate a positive electrode.

First, a positive electrode of the secondary battery will be described with reference to FIGS. 16A and 16B.

A positive electrode 6000 includes, for example, a positive electrode current collector 6001 and a positive electrode active material layer 6002 formed on the positive electrode current collector 6001 by a coating method, a CVD method, a sputtering method, or the like. FIG. 16A shows an example in which the positive electrode active material layer 6002 is provided on both surfaces of the positive electrode current collector 6001 with a sheet shape (or a strip-like shape); however, one embodiment of the present invention is not limited to this example. The positive electrode active material layer 6002 may be provided on one of the surfaces of the positive electrode current collector 6001. Further, although the positive electrode active material layer 6002 is provided on the entire surface of the positive electrode current collector 6001 in FIG. 16A, one embodiment of the present invention is not limited thereto. The positive electrode active material layer 6002 may be provided on part of the positive electrode current collector 6001. For example, the positive electrode active material layer 6002 does not need to be provided in a portion where the positive electrode current collector 6001 is connected to a positive electrode tab.

The positive electrode current collector 6001 can be formed using a material that has high conductivity and is not alloyed with a carrier ion of lithium or the like, such as stainless steel, gold, platinum, zinc, iron, copper, aluminum, or titanium, an alloy thereof, or the like. Alternatively the positive electrode current collector 6001 can be formed using an aluminum alloy to which an element which improves heat resistance, such as silicon, titanium, neodymium, scandium, or molybdenum, is added. Further alternatively, the positive electrode current collector 6001 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, and nickel. The positive electrode current collector 6001 may have a foil shape, a plate (sheet) shape, a net shape, a punching-metal shape, an expanded-metal shape, or the like as appropriate. The positive electrode current collector 6001 preferably has a thickness of greater than or equal to 10 µm and less than or equal to 30 µm.

Figure 16B:
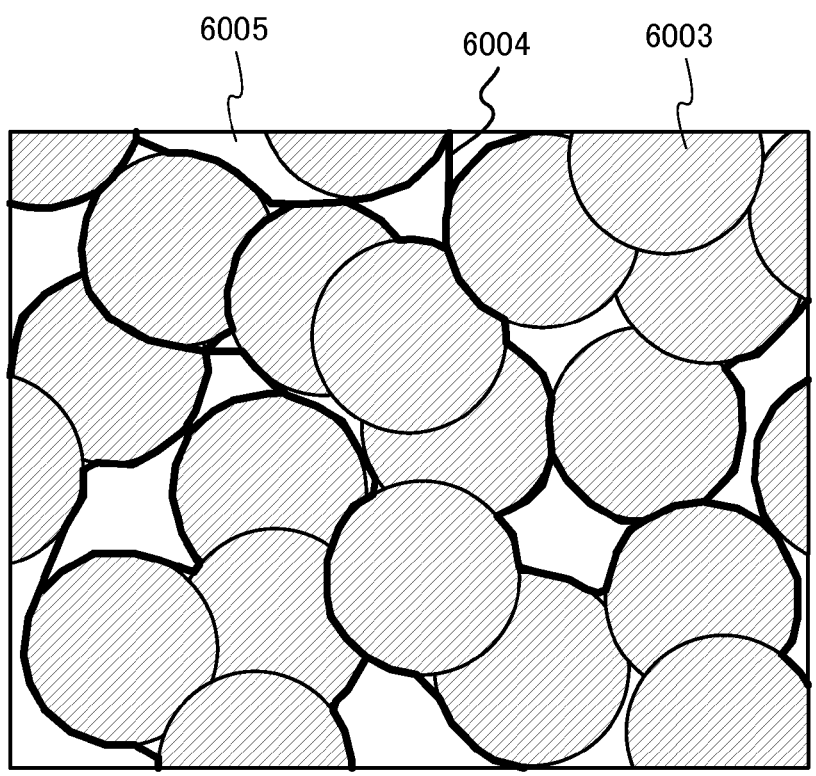

FIG. 16B is a schematic view illustrating the longitudinal cross-sectional view of the positive electrode active material layer 6002. The positive electrode active material layer 6002 includes particles of the positive electrode active material 6003, graphene 6004 as a conductive additive, and a binder 6005.

Examples of the conductive additive include acetylene black (AB) and graphite (black lead) particles in addition to graphene described later. Here, the positive electrode active material layer 6002 using the graphene 6004 is described as an example.

The positive electrode active material 6003 is in the form of particles made of secondary particles having an average particle diameter and particle diameter distribution, which are obtained in such a way that material compounds are mixed at a predetermined ratio and baked and the resulting baked product is crushed, granulated, and classified by an appropriate means. For this reason, the positive electrode active material 6003 is schematically illustrated as spheres in FIG. 16B; however, the shape of the positive electrode active material 6003 is not limited to this shape.

As the positive electrode active material 6003, a material into/from which carrier ions such as lithium ions can be inserted and extracted is used, and examples of the material include a material having an olivine crystal structure, a layered rock-salt crystal structure, or a spinel crystal structure.

An example of the material with an olivine crystal structure which can be used as the positive electrode active material 6003, is a composite oxide represented by a general formula $LiMPO_4$ (M is one or more of Fe(II), Mn(II), Co(II), and Ni(II)). Typical examples of the general formula $LiMPO_4$ are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly has properties necessary for the positive electrode active material, such as safety, stability, high capacity density, high potential, and the existence of lithium ions which can be extracted in initial oxidation (charging).

Examples of the material with a layered rock-salt crystal structure include lithium cobalt oxide ($LiCoO_2$), $LiNiO_2$, $LiMnO_2$, $Li_2MnO_3$, a NiCo-based material (general formula: $LiNi_xCo_{1-x}O_2$ (0<x<1)) such as $LiNi_{0.8}Co_{0.2}O_2$, a NiMn-based material (general formula: $LiNi_xMn_{1-x}O_2$ (0<x<1)) such as $LiNi_{0.5}Mn_{0.5}O_2$, a NiMnCo-based material (also referred to as NMC, and general formula: $LiNi_xMn_yCo_{1-x-y}O_2$ (x>0, y>0, x+y<1)) such as $LiNi_{1/3}Mn_{1/3}Co_{1/3}O_2$, $Li(Ni_{0.8}Co_{0.15}Al_{0.05})O_2$, and $Li_2MnO_3$—$LiMO_2$ (M=Co, Ni, or Mn).

$LiCoO_2$ is particularly preferable because it has high capacity, stability in the air higher than that of $LiNiO_2$, and thermal stability higher than that of $LiNiO_2$, for example.

Examples of the material with a spinel crystal structure include $LiMn_2O_4$, $Li_{1+x}Mn_{2-x}O_4$, $Li(MnAl)_2O_4$, and $LiMn_{1.5}Ni_{0.5}O_4$.

It is preferable to add a small amount of lithium nickel oxide ($LiNiO_2$ or $LiNi_{1-x}MO_2$ (M=Co, Al, or the like)) to the material with a spinel crystal structure that contains manganese such as $LiMn_2O_4$, in which case the elution of manganese and the decomposition of an electrolyte solution can be suppressed, for example.

A composite oxide expressed by $Li_{(2-j)}MSiO_4$ (general formula) (M is one or more of Fe(II), Mn(II), Co(II), and Ni(II), 0≤j≤2) can also be used as the positive electrode active material. Typical examples of the general formula $Li_{(2-j)}MSiO_4$ are $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u ≤1, 0<r<1, 0<s<1, 0<t<1, and 0<u<1).

Alternatively, a nasicon compound represented by a general formula $A_xM_2(XO_4)_3$ (A=Li, Na, or Mg, M=Fe, Mn, Ti, V, Nb, or Al, X=S, P, Mo, W, As, or Si) can be used as the positive electrode active material. Examples of the nasicon compound are $Fe_2(MnO_4)_3$, $Fe_2(SO_4)_3$, and $Li_3Fe_2(PO_4)_3$. Further alternatively, a compound represented by a general formula $Li_2MPO_4F$, $Li_2MP_2O_7$, or $Li_5MO_4$ (M=Fe or Mn), a perovskite fluoride such as $NaF_3$ or $FeF_3$, a metal chalcogenide (a sulfide, a selenide, or a telluride) such as $TiS_2$ or $MoS_2$, a compound with an inverse spinel crystal structure such as $LiMVO_4$, a vanadium oxide ($V_2O_5$, $V_6O_{13}$, $LiV_3O_8$, or the like), a manganese oxide, an organic sulfur, or the like can be used as the positive electrode active material.

In the case where carrier ions are alkali metal ions other than lithium ions, or alkaline-earth metal ions, the positive electrode active material 6003 may contain, instead of lithium in the compound and the oxide, an alkali metal (e.g., sodium or potassium), an alkaline-earth metal (e.g., calcium, strontium, barium, beryllium, or magnesium). For example, the positive electrode active material may be a layered oxide containing sodium such as $NaFeO_2$ or $Na_{2/3}[Fe_{1/2}Mn_{1/2}]O_2$.

Alternatively, $LiNiPO_4$ may be used as the positive electrode active material.

Further alternatively, any of the aforementioned materials may be combined to be used as the positive electrode active material. For example, the positive electrode active material may be a solid solution containing any of the aforementioned materials, e.g., a solid solution containing $LiCo_{1/3}Mn_{1/3}Ni_{1/3}O_2$ and $Li_2MnO_3$.

Although not illustrated, a carbon layer may be provided on a surface of the positive electrode active material 6003. The carbon layer increases the conductivity of an electrode.

The positive electrode active material 6003 can be coated with the carbon layer by mixing a carbohydrate such as glucose at the time of baking the positive electrode active material.

In addition, the graphene 6004 which is added to the positive electrode active material layer 6002 as a conductive additive can be formed by performing reduction treatment on graphene oxide.

In this specification, graphene includes single-layer graphene or multilayer graphene including two to a hundred layers. The single-layer graphene refers to a one-atom-thick sheet of carbon molecules having $\pi$ bonds. Further, graphene oxide refers to a compound formed by oxidation of graphene. When graphene oxide is reduced to form graphene, oxygen contained in the graphene oxide is not entirely extracted and part of the oxygen remains in the graphene in some cases. When the graphene contains oxygen, the ratio of the oxygen in the graphene measured by X-ray photoelectron spectroscopy (XPS) is higher than or equal to 2 atomic % and lower than or equal to 20 atomic %, preferably higher than or equal to 3 atomic % and lower than or equal to 15 atomic %.

In the case where multilayer graphene includes graphene obtained by reducing graphene oxide, the interlayer distance of the graphene is greater than or equal to 0.34 nm and less than or equal to 0.5 nm, preferably greater than or equal to 0.38 nm and less than or equal to 0.42 nm, and more preferably greater than or equal to 0.39 nm and less than or equal to 0.41 nm. In general graphite, the interlayer distance of single-layer graphene is 0.34 nm. Since the interlayer distance in the graphene used for the secondary battery of one embodiment of the present invention is longer than that in the general graphite, carrier ions can easily transfer between layers of the multilayer graphene.

Graphene oxide can be formed by an oxidation method called a Hummers method, for example.

The Hummers method is as follows: a sulfuric acid solution of potassium permanganate, a hydrogen peroxide solution, and the like are mixed into a graphite powder to cause oxidation reaction; thus, a dispersion liquid including graphite oxide is formed. Through the oxidation of carbon in graphite, functional groups such as an epoxy group, a carbonyl group, a carboxyl group, or a hydroxyl group are bonded in the graphite oxide. Accordingly, the interlayer distance between a plurality of pieces of graphene in the graphite oxide is longer than that in the graphite, so that the graphite oxide can be easily separated into thin pieces by interlayer separation. Then, ultrasonic vibration is applied to the mixed solution containing the graphite oxide, so that the graphite oxide whose interlayer distance is long can be cleaved to separate graphene oxide and to form a dispersion liquid containing graphene oxide. The solvent is removed from the dispersion liquid containing the graphene oxide, so that powdery graphene oxide can be obtained.

Note that the method for forming graphene oxide is not limited to the Hummers method using a sulfuric acid solution of potassium permanganate; for example, the Hummers method using nitric acid, potassium chlorate, nitric acid sodium, potassium permanganate, or the like or a method for forming graphene oxide that does not use the Hummers method may be employed as appropriate.

Graphite oxide may be separated into thin pieces by application of ultrasonic vibration, by irradiation with microwaves, radio waves, or thermal plasma, or by application of physical stress.

The formed graphene oxide includes an epoxy group, a carbonyl group, a carboxyl group, a hydroxyl group, or the like. Oxygen in a functional group of graphene oxide is negatively charged in a polar solvent typified by NMP (also referred to as N-methylpyrrolidone, 1-methyl-2-pyrrolidone, N-methyl-2-pyrrolidone, or the like); therefore, while interacting with NMP, the graphene oxide repels other graphene oxide and is hardly aggregated. For this reason, in a polar solvent, graphene oxide can be easily dispersed uniformly.

The length of one side (also referred to as a flake size) of the graphene oxide is greater than or equal to 50 nm and less than or equal to 100 µm), preferably greater than or equal to 800 nm and less than or equal to 20 µm.

As illustrated in the cross-sectional view of the positive electrode active material layer 6002 in FIG. 16B, the plurality of particles of the positive electrode active material 6003 are coated with a plurality of pieces of the graphene 6004. The sheet-like graphene 6004 is connected to the plurality of particles of the positive electrode active material 6003. In particular, since the graphene 6004 has the sheet shape, surface contact can be made in such a way that part of surfaces of the particles of the positive electrode active material 6003 are wrapped with the graphene 6004. Unlike a conductive additive in the form of particles such as acetylene black, which makes point contact with a positive electrode active material, the graphene 6004 is capable of surface contact with low contact resistance; accordingly, the electron conductivity between the particles of the positive electrode active material 6003 and the graphene 6004 can be improved without an increase in the amount of a conductive additive.

Further, surface contact is made between the plurality of pieces of the graphene 6004. This is because graphene oxide with extremely high dispersibility in a polar solvent is used for the formation of the graphene 6004. The solvent is removed by volatilization from a dispersion medium in which the graphene oxide is uniformly dispersed, and the graphene oxide is reduced to give graphene; hence, pieces of the graphene 6004 remaining in the positive electrode active material layer 6002 are partly overlapped with each other and dispersed such that surface contact is made, thereby forming a path for electron conduction.

Further, some pieces of the graphene 6004 are arranged three-dimensionally between the particles of the positive electrode active material 6003. Furthermore, the graphene 6004 is an extremely thin film (sheet) made of a single layer of carbon molecules or stacked layers thereof and hence is in contact with part of the surfaces of the particles of the positive electrode active material 6003 in such a way as to cover and fit these surfaces. A portion of the graphene 6004 which is not in contact with the particles of the positive electrode active material 6003 is warped between the plurality of particles of the positive electrode active material 6003 and crimped or stretched.

Consequently, a network for electron conduction is formed in the positive electrode 6000 by the pieces of the graphene 6004. Therefore, a path for electric conduction between the particles of the positive electrode active material 6003 is maintained. As described above, graphene whose raw material is graphene oxide and which is formed by reduction performed after a paste is formed is employed as a conductive additive, so that the positive electrode active material layer 6002 with high electron conductivity can be formed.

The ratio of the positive electrode active material 6003 in the positive electrode active material layer 6002 can be increased because it is not necessary to increase the added amount of the conductive additive in order to increase contact points between the positive electrode active material 6003 and the graphene 6004. Accordingly, the discharge capacity of the secondary battery can be increased.

The average particle diameter of the primary particle of the positive electrode active material 6003 is less than or equal to 500 nm, preferably greater than or equal to 50 nm and less than or equal to 500 nm. To make surface contact with the plurality of particles of the positive electrode active material 6003, the length of one side of the graphene 6004 is greater than or equal to 50 nm and less than or equal to 100 µm, preferably greater than or equal to 800 nm and less than or equal to 20 µm.

Examples of the binder included in the positive electrode active material layer 6002 include polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose, in addition to polyvinylidene fluoride (PVDF) which is a typical example.

The above-described positive electrode active material layer 6002 preferably includes the positive electrode active material 6003 at greater than or equal to 90 wt % and less than or equal to 94 wt %, the graphene 6004 as the conductive additive at greater than or equal to 1 wt % and less than or equal to 5 wt %, and the binder at greater than or equal to 1 wt % and less than or equal to 5 wt % with respect to the total weight of the positive electrode active material layer 6002.

[2. Negative Electrode]

Figure 17A:
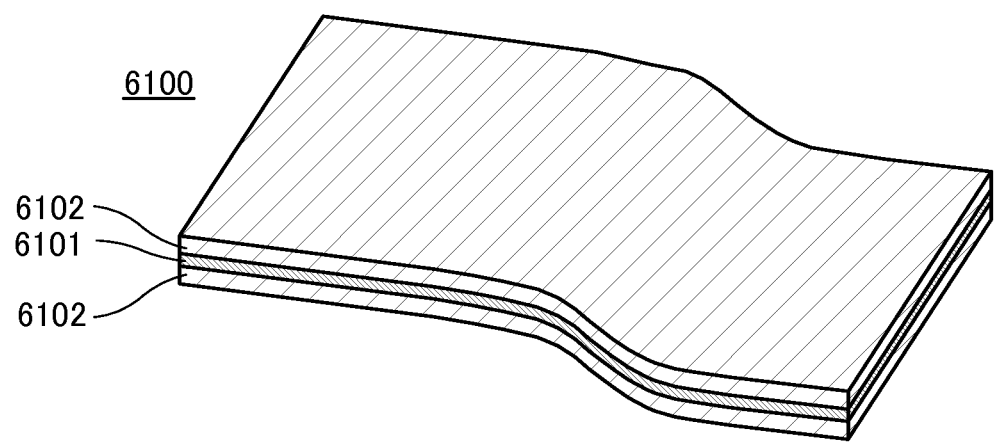
FIGS. 17A and 17B illustrate a negative electrode.

Next, a negative electrode of the secondary battery will be described with reference to FIGS. 17A and 17B.

A negative electrode 6100 includes, for example, a negative electrode current collector 6101 and a negative electrode active material layer 6102 formed on the negative electrode current collector 6101 by a coating method, a CVD method, a sputtering method, or the like. FIG. 17A shows an example in which the negative electrode active material layer 6102 is provided on both surfaces of the negative electrode current collector 6101 with a sheet shape (or a strip-like shape); however, one embodiment of the present invention is not limited to this example. The negative electrode active material layer 6102 may be provided on one of the surfaces of the negative electrode current collector 6101. Further, although the negative electrode active material layer 6102 is provided on the entire surface of the negative electrode current collector 6101 in FIG. 17A, one embodiment of the present invention is not limited thereto. The negative electrode active material layer 6102 may be provided on part of the negative electrode current collector 6101. For example, the negative electrode active material layer 6102 does not need to be provided in a portion where the negative electrode current collector 6101 is connected to a negative electrode tab.

The negative electrode current collector 6101 can be formed using a material which has high conductivity and is not alloyed with a carrier ion of lithium or the like, such as stainless steel, gold, platinum, zinc, iron, copper, or titanium, an alloy thereof, or the like. Alternatively, the negative electrode current collector 6101 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, and nickel. The negative electrode current collector 6101 can have a foil shape, a plate (sheet) shape, a net shape, a punching-metal shape, an expanded-metal shape, or the like as appropriate. The negative electrode current collector 6101 preferably has a thickness of greater than or equal to 10 µm and less than or equal to 30 µmi.

Figure 17B:
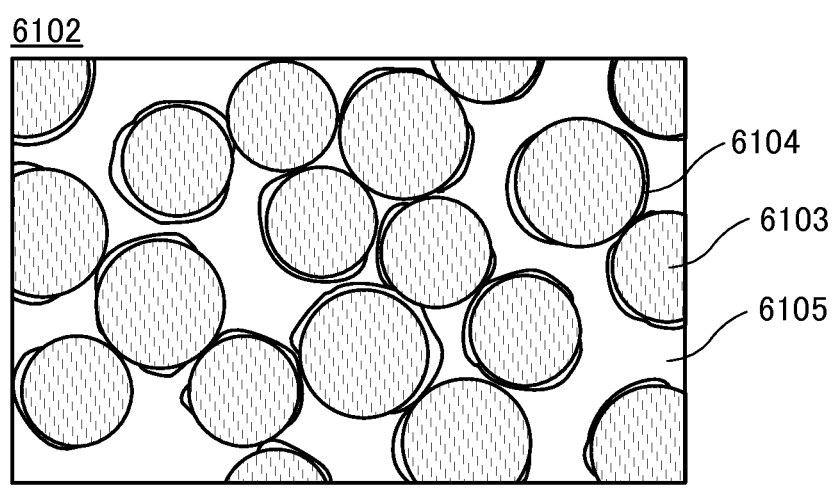

FIG. 17B is a schematic view illustrating part of a cross-section of the negative electrode active material layer 6102. Although an example of the negative electrode active material layer 6102 including the negative electrode active material 6103 and the binder 6105 is shown here, one embodiment of the present invention is not limited to this example. The negative electrode active material layer 6102 only needs to include at least the negative electrode active material 6103.

There is no particular limitation on the material of the negative electrode active material 6103 as long as it is a material with which lithium can be dissolved and precipitated or a material into/from which lithium ions can be inserted and extracted. Other than a lithium metal or lithium titanate, a carbon-based material generally used in the field of power storage, or an alloy-based material can also be used as the negative electrode active material 6103.

The lithium metal is preferable because of its low redox potential (which is lower than that of the standard hydrogen electrode by 3.045 V) and high specific capacity per unit weight and per unit volume (3860 mAh/g and 2062 mAh/$cm^3$).

Examples of the carbon-based material include graphite, graphitizing carbon (soft carbon), non-graphitizing carbon (hard carbon), a carbon nanotube, graphene, and carbon black.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

The negative electrode active material can be an alloy-based material which enables charge-discharge reaction by alloying and dealloying reaction with lithium. In the case where lithium ions are carrier ions, the alloy-based material is, for example, a material containing at least one of Al, Si, Ge, Sn, Pb, Sb, Bi, Ag, Zn, Cd, In, Ga, and the like. Such elements have higher capacity than carbon. In particular, silicon has a significantly high theoretical capacity of 4200 mAh/g. For this reason, silicon is preferably used as the negative electrode active material. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used as the negative electrode active material.

Still alternatively, $Li_{3-x}M_xN$ (M=Co, Ni, or Cu) with a $Li_3N$ structure, which is a nitride containing lithium and a transition metal, can be used as the negative electrode active material. For example, $Li_{2.6}Co_{0.4}N_3$ is preferable because of its high charge and discharge capacity (900 mAh/g and 1890 mAh/$cm^3$).

A nitride containing lithium and a transition metal is preferably used, in which case the negative electrode active material includes lithium ions and thus can be used in combination with a positive electrode active material that does not contain lithium ions, such as $V_2O_5$ or $Cr_3O_8$. Note that in the case where a positive electrode active material contains lithium ions, the lithium ions contained in the positive electrode active material are extracted in advance, so that the nitride containing lithium and a transition metal can be used as the negative electrode active material.

Alternatively, a material which causes a conversion reaction can be used as the negative electrode active material; for example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can also be used as the positive electrode active material because of its high potential.

Although the negative electrode active material 6103 is illustrated as a particulate substance in FIG. 17B, the shape of the negative electrode active material 6103 is not limited thereto, and may be a given shape such as a plate shape, a rod shape, a cylindrical shape, a powder shape, or a flake shape. Further, the negative electrode active material 6103 may have a three-dimensional shape such as unevenness on a surface with a plate shape, fine unevenness on a surface, or a porous shape.

The negative electrode active material layer 6102 may be formed by a coating method in such a manner that a conductive additive (not illustrated) and the binder are added to the negative electrode active material 6103 to form a negative electrode paste and the negative electrode paste is applied onto the negative electrode current collector 6101 and dried.

Note that the negative electrode active material layer 6102 may be predoped with lithium. As a predoping method, a sputtering method may be performed to form a lithium layer on a surface of the negative electrode active material layer 6102. Alternatively, the negative electrode active material layer 6102 can be predoped with lithium by providing lithium foil on the surface thereof.

Further, graphene (not illustrated) is preferably formed on a surface of the negative electrode active material 6103. In the case of using silicon as the negative electrode active material 6103, the volume of silicon is greatly changed due to occlusion and release of carrier ions in charge-discharge cycles. Therefore, adhesion between the negative electrode current collector 6101 and the negative electrode active material layer 6102 is decreased, resulting in degradation of battery characteristics caused by charging and discharging. In view of this, graphene is preferably formed on a surface of the negative electrode active material 6103 containing silicon because even when the volume of silicon is changed in charge-discharge cycles, decrease in the adhesion between the negative electrode current collector 6101 and the negative electrode active material layer 6102 can be regulated, which makes it possible to reduce degradation of battery characteristics.

Graphene formed on the surface of the negative electrode active material 6103 can be formed by reducing graphene oxide in a manner similar to that for forming the positive electrode. As the graphene oxide, the above-described graphene oxide can be used.

Further, a coating film 6104 of oxide or the like may be formed on the surface of the negative electrode active material 6103. A coating film formed by decomposition of an electrolyte solution in charging cannot release electric charges used at the time of forming the coating film, and therefore forms irreversible capacity. In contrast, the coating film 6104 of oxide or the like provided on the surface of the negative electrode active material 6103 in advance can reduce or prevent generation of irreversible capacity.

As the coating film 6104 coating the negative electrode active material 6103, an oxide film of any one of niobium, titanium, vanadium, tantalum, tungsten, zirconium, molybdenum, hafnium, chromium, aluminum, and silicon or an oxide film containing any one of these elements and lithium can be used. The coating film 6104 is denser than a conventional coating film formed on a surface of a negative electrode because of a decomposition product of an electrolyte solution.

For example, niobium oxide ($Nb_2O_5$) has a low electric conductivity of $10^{-9}$ $S/cm^2$ and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ $cm^2/sec$ and high lithium ion conductivity. Therefore, niobium oxide can transmit lithium ions.

A sol-gel method can be used to coat the negative electrode active material 6103 with the coating film 6104, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film 6104 can be formed on the surface of the negative electrode active material 6103.

A decrease in the capacity of the power storage unit can be prevented by using the coating film 6104.

Figure 18:
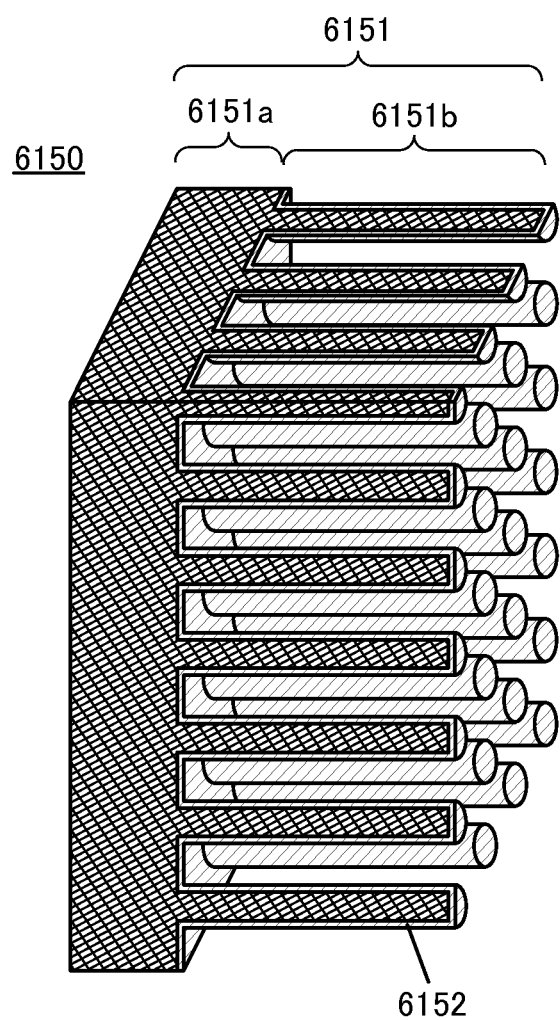
FIG. 18 illustrates a negative electrode.

Next, a negative electrode 6150 having a shape different from that of the negative electrode 6100 will be described with reference to FIG. 18. FIG. 18 is a schematic cross-sectional view illustrating an enlarged surface of the negative electrode 6150 in which a negative electrode active material layer 6152 is formed on a negative electrode current collector 6151.

The negative electrode current collector 6151 includes a plurality of protrusion portions 6151b and a base portion 6151a to which the plurality of protrusion portions are connected. Thus, the negative electrode current collector 6151 has a structure like a spiky frog (kenzan) used in the Japanese art of flower arrangement. Although the base portion 6151a is thin in the drawing, the base portion 6151a is generally much thicker than the protrusion portions 6151b.

The plurality of protrusion portions 6151b extend in the direction substantially perpendicular to a surface of the base portion 6151a. Here, the word "substantially" is used to mean a slight deviation from the perpendicular direction due to an error in leveling in a manufacturing process of the negative electrode current collector, step variation in a manufacturing process of the protrusion portions 6151b, deformation due to repeated charge and discharge, and the like is acceptable although the angle between the surface of the base portion 6151*a* and a center axis of the protrusion portion 6151*b* in the longitudinal direction is preferably 90°. Specifically, the angle between the surface of the base portion 6151*a* and the center axis of the protrusion portion 6151*b* in the longitudinal direction is less than or equal to 90°±10°, preferably less than or equal to 90°±5°. Note that the direction in which the plurality of protrusion portions 6151*b* extend from the base portion 6151*a* is referred to as the longitudinal direction.

The negative electrode current collector 6151 is formed using a material which is not alloyed with lithium in a potential region used as a current collector and has high corrosion resistance. The negative electrode current collector 6151 can be formed using, for example, a material having high electric conductivity, such as a metal typified by stainless steel, gold, platinum, zinc, iron, aluminum, copper, or titanium, or an alloy thereof. Note that the negative electrode current collector 6151 is preferably formed using an aluminum alloy to which an element which improves heat resistance, such as silicon, titanium, neodymium, scandium, or molybdenum, is added. Alternatively, the negative electrode current collector 6151 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, and nickel.

Titanium is particularly preferable as a material for the negative electrode current collector 6151. Titanium has higher strength than steel, has mass which is less than or equal to half of that of steel, and is very light. In addition, titanium has strength about twice as high as that of aluminum and is less likely to have metal fatigue than other metals. Thus, titanium allows a light battery to be achieved and can function as a core of a negative electrode active material layer, which has resistance to repeated stress, so that deterioration or breakage due to expansion and contraction of silicon can be suppressed. Moreover, titanium is very suitable for processing by dry etching and makes it possible to form a protrusion portion with a high aspect ratio on a surface of a current collector.

The negative electrode current collector 6151 can have a foil-like shape, a plate-like shape (sheet-like shape), a net-like shape, a punching-metal shape, an expanded-metal shape, or the like as appropriate. In the case where a current collector material having a shape with an opening such as a net-like shape, a protrusion portion is formed on a surface of the current collector material other than the opening in a subsequent process.

The negative electrode active material layer 6152 is provided to cover a top surface of the base portion 6151*a* on which the protrusion portion 6151*b* is not provided and side surfaces and top surfaces of the protrusion portions 6151*b*, that is, an exposed surface of the negative electrode current collector 6151.

Note that the term "active material" refers to a material that relates to insertion and extraction of carrier ions. An active material layer may include, in addition to the active material, one or more of a conductive additive, a binder, a graphene, and the like. Thus, the active material and the active material layer are distinguished.

The negative electrode active material layer 6152 is formed using any one or more of silicon, germanium, tin, aluminum, and the like, which are capable of insertion and extraction of ions serving as carriers. Note that silicon is preferably used for the negative electrode active material layer 6152 because of its high theoretical charge-discharge capacity. In the case where silicon is used as a negative electrode active material, silicon has higher theoretical insertion capacity than black lead which is currently used; thus, an increase in capacity of a lithium ion secondary battery or a reduction in size of a lithium secondary battery can be achieved.

In the case where silicon is used for the negative electrode active material layer 6152, amorphous silicon, microcrystalline silicon, polycrystalline silicon, or a combination thereof can be used. In general, silicon with higher crystallinity has higher electric conductivity; thus, silicon can be used for a high-conductivity electrode of a battery. Meanwhile, more carrier ions such as lithium ions can be inserted in the case of amorphous silicon than in the case of crystalline silicon; thus, discharge capacity can be increased.

As an example in which plural kinds of crystalline silicon are combined, a polycrystalline silicon film is formed over the protrusion portions 6151*b* and an amorphous silicon film is formed over the polycrystalline silicon film, whereby the negative electrode active material layer 6152 can have a two-layer structure of the polycrystalline silicon film and the amorphous silicon film. In that case, higher conductivity can be secured by the polycrystalline silicon film on the inner side and carrier ions can be inserted in the amorphous silicon film around the polycrystalline silicon film. Alternatively, instead of the two-layer structure, the negative electrode active material layer 6152 can have a structure in which a silicon film is formed to have polycrystalline silicon on the inner side in contact with the current collector and amorphous silicon toward the outer side of the protrusion portion so that the crystallinity continuously changes. In that case, an effect similar to that of the two-layer structure can be obtained.

As another example in which plural kinds of crystalline silicon are combined, amorphous silicon can be used for the negative electrode active material layer over the protrusion portions 6151*b* and polycrystalline silicon can be used for the negative electrode active material layer over the base portion 6151*a*. Fewer ions are inserted in polycrystalline silicon than in amorphous silicon. Thus, the negative electrode active material layer over the protrusion portions 6151*b* is used for the formation of high capacity, while the negative electrode active material layer over the base portion 6151*a*, which is formed of polycrystalline silicon, can be used as a highly reliable film in which expansion is suppressed.

Alternatively, silicon to which an impurity element imparting one conductivity type, such as phosphorus or boron, is added may be used for the negative electrode active material layer 6152. Silicon to which the impurity element imparting one conductivity type, such as phosphorus or boron, is added has higher electric conductivity and can increase the electric conductivity of the negative electrode accordingly.

The base portion 6151*a* functions as a terminal of a lithium ion secondary battery and also as a base of the plurality of protrusion portions 6151*b*. The base portion 6151*a* and the plurality of protrusion portions 6151*b* are formed using the same metal material and are physically continuous. Therefore, the protrusion portion 6151*b* and the base portion 6151*a* are combined to be strongly bonded to each other in a connection portion therebetween; thus, even the connection portion where stress is particularly concentrated because of expansion and contraction of the negative electrode active material layer 6152 provided over the base portion 6151*a* and the protrusion portion 6151*b* has strength high enough to withstand the stress. Thus, the protrusion portion 6151*b* can function as a core of the negative electrode active material layer 6152.

The plurality of protrusion portions have translation symmetry and are formed with high uniformity in the negative electrode, so that local reaction can be reduced in each of the positive electrode and the negative electrode, and carrier ions and the active material react with each other uniformly between the positive electrode and the negative electrode. Thus, in the case where the negative electrode 6150 is used for a lithium ion secondary battery, high-speed charge and discharge becomes possible and breakdown and separation of the active material due to charge and discharge can be suppressed, whereby a lithium ion secondary battery with improved cycle characteristics can be manufactured.

Furthermore, when the shapes of the protrusions can be substantially the same, local charge/discharge can be reduced, and the weight of the active material can be controlled. In addition, when the heights of the protrusions are substantially the same, load can be prevented from being applied locally in the manufacturing process of the battery, which can increase the yield. Accordingly, specifications of the battery can be well controlled.

[3. Electrolyte Solution]

As a solvent of an electrolyte solution used for a secondary battery, an aprotic organic solvent is preferable. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

The use of a gelled high-molecular material as the solvent of the electrolyte solution improves the safety against liquid leakage and the like. Further, the secondary battery can be made thinner and more lightweight. Typical examples of gelled high-molecular materials include a silicone gel, an acrylic gel, an acrylonitrile gel, polyethylene oxide, polypropylene oxide, and a fluorine-based polymer.

Alternatively, the use of one or more ionic liquids (room temperature molten salts) which are less likely to burn and volatilize as the solvent of the electrolyte solution can prevent the secondary battery from exploding or catching fire even when the secondary battery internally shorts out or the internal temperature increases due to overcharging or the like.

In the case of using lithium ions as carriers, for example, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used as an electrolyte dissolved in the above solvent, or two or more of these lithium salts can be used in an appropriate combination in an appropriate ratio.

The electrolyte solution used for a power storage unit preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1%, and more preferably less than or equal to 0.01%.

[4. Separator]

As a separator of a secondary battery, a porous insulator such as cellulose, polypropylene (PP), polyethylene (PE), polybutene, nylon, polyester, polysulfone, polyacrylonitrile, polyvinylidene fluoride, or tetrafluoroethylene can be used. Further, nonwoven fabric of a glass fiber or the like, or a diaphragm in which a glass fiber and a polymer fiber are mixed may be used.

[5. Nonaqueous Secondary Battery]

Next, structures of nonaqueous secondary batteries will be described with reference to FIGS. 19A and 19B, FIGS. 20A and 20B, and FIGS. 21A and 21B.

[5-1. Laminated Secondary Battery]

Figure 19A:
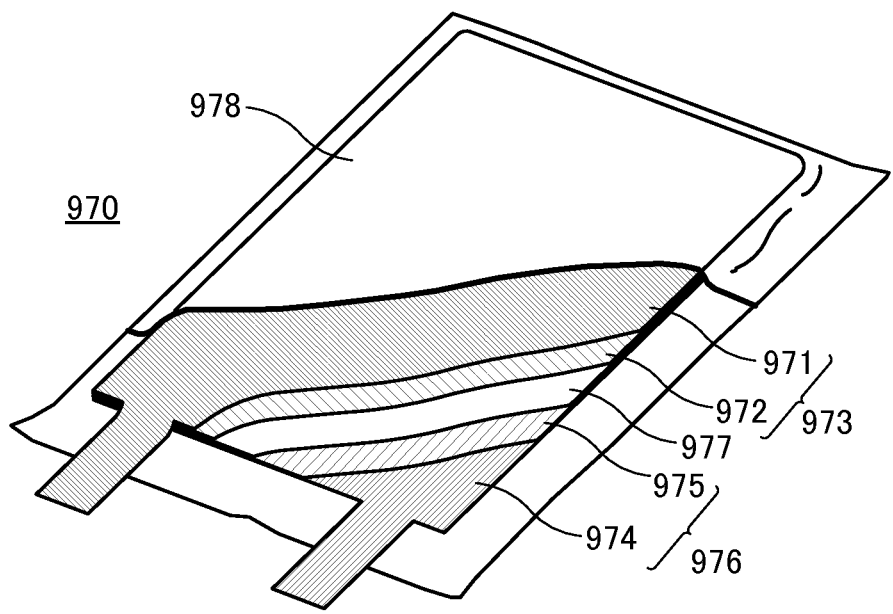
FIGS. 19A and 19B each illustrate a power storage unit.

An example of a laminated secondary battery will be described with reference to FIG. 19A. In FIG. 19A, a structure inside the laminated secondary battery is partly exposed for convenience of explanation.

A laminated secondary battery 970 illustrated in FIG. 19A includes a positive electrode 973 including a positive electrode current collector 971 and a positive electrode active material layer 972, a negative electrode 976 including a negative electrode current collector 974 and a negative electrode active material layer 975, a separator 977, an electrolyte solution (not illustrated), and an exterior body 978. The separator 977 is provided between the positive electrode 973 and the negative electrode 976 in the exterior body 978. The exterior body 978 is filled with the electrolyte solution. Although a single positive electrode 973, a single negative electrode 976, and a single separator 977 are used in FIG. 19A, the secondary battery may have a stacked structure in which positive electrodes and negative electrodes are alternately stacked and separated by separators.

For the positive electrode, the negative electrode, the separator, and the electrolyte solution (an electrolyte and a solvent), the above-described members can be used.

In the laminated secondary battery 970 illustrated in FIG. 19A, the positive electrode current collector 971 and the negative electrode current collector 974 also serve as terminals (tabs) for electrical contact with the outside. For this reason, the positive electrode current collector 971 and the negative electrode current collector 974 each have a part exposed outside the exterior body 978.

The exterior body 978 in the laminated secondary battery 970 can be formed using, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film. With such a three-layer structure, permeation of the electrolyte solution and a gas can be blocked and an insulating property and resistance to the electrolyte solution can be obtained.

[5-3. Rectangular Secondary Battery]

Figure 19B:
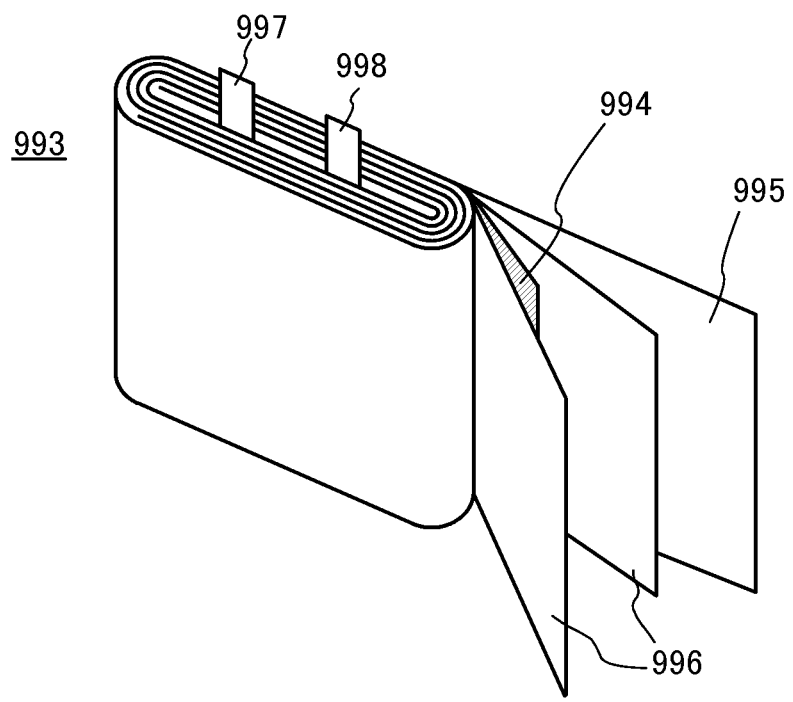

Next, an example of a rectangular secondary battery will be described with reference to FIG. 19B. A wound body 993 illustrated in FIG. 19B includes a negative electrode 994, a positive electrode 995, and a separator 996. The wound body 993 is obtained by winding a sheet of a stack in which the negative electrode 994 overlaps with the positive electrode 995 with the separator 996 provided therebetween. The wound body 993 is covered with a rectangular sealed can or the like; thus, a rectangular secondary battery is manufactured. Note that the number of stacks each including the negative electrode 994, the positive electrode 995, and the separator 996 may be determined as appropriate depending on the necessary capacity and element volume.

As in the cylindrical secondary battery, the negative electrode 994 is connected to a negative electrode tab (not illustrated) through one of a terminal 997 and a terminal 998, and the positive electrode 995 is connected to a positive electrode tab (not illustrated) through the other of the terminal 997 and the terminal 998. Surrounding structures such as a safety valve mechanism are similar to those in the cylindrical secondary battery.

As described above, although the laminated secondary battery and the rectangular secondary battery are described as examples of the secondary battery, secondary batteries having other shapes can also be used. It is also possible to employ a structure in which a plurality of positive electrodes, a plurality of negative electrodes, and a plurality of separators are stacked or wound.

Figure 20A:
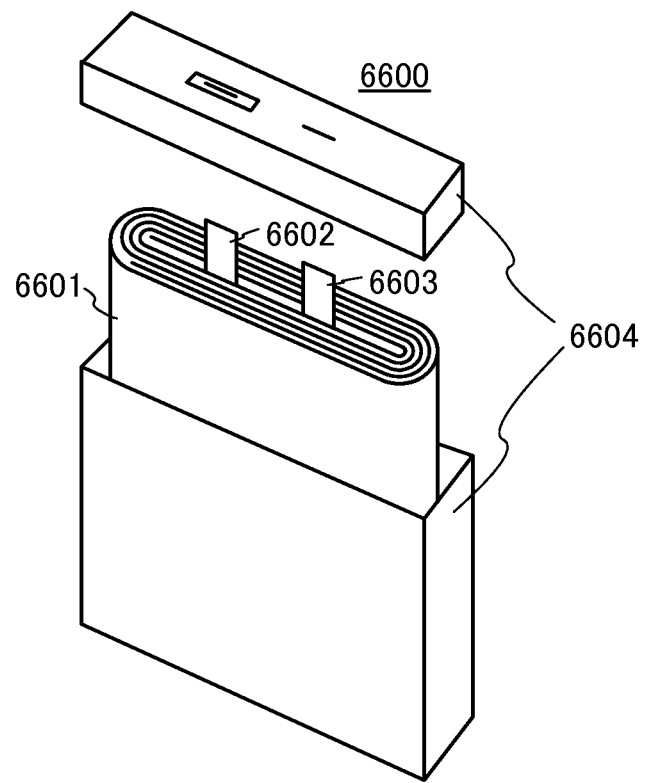
FIGS. 20A and 20B illustrate a power storage unit.
Figure 20B:
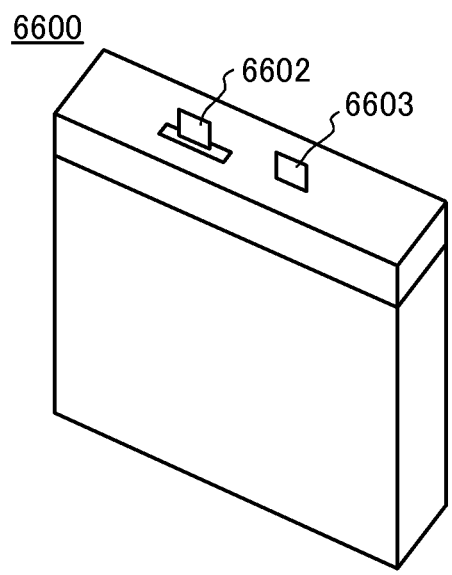

In a power storage unit 6600 illustrated in FIGS. 20A and 20B, a wound body 6601 is stored inside a battery can 6604. The wound body 6601 includes a terminal 6602 and a terminal 6603, and is impregnated with an electrolyte solution inside the battery can 6604. It is preferable that the terminal 6603 be in contact with the battery can 6604, and the terminals 6602 be insulated from the battery can 6604 with the use of an insulating member or the like. A metal material such as aluminum or a resin material can be used for the battery can 6604.

[5-2. Cylindrical Secondary Battery]

Figure 21A:
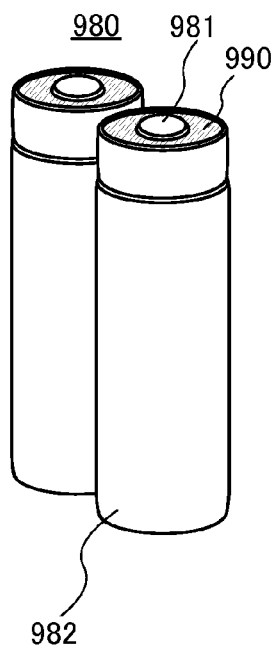
FIGS. 21A and 21B illustrate a power storage unit.

Next, an example of a cylindrical secondary battery will be described with reference to FIGS. 21A and 21B. As illustrated in FIG. 21A, a cylindrical secondary battery 980 includes a positive electrode cap (battery lid) 981 on the top surface and a battery can (outer can) 982 on the side surface and bottom surface. The positive electrode cap 981 and the battery can (outer can) 982 are insulated by a gasket 990 (insulating packing).

Figure 21B:
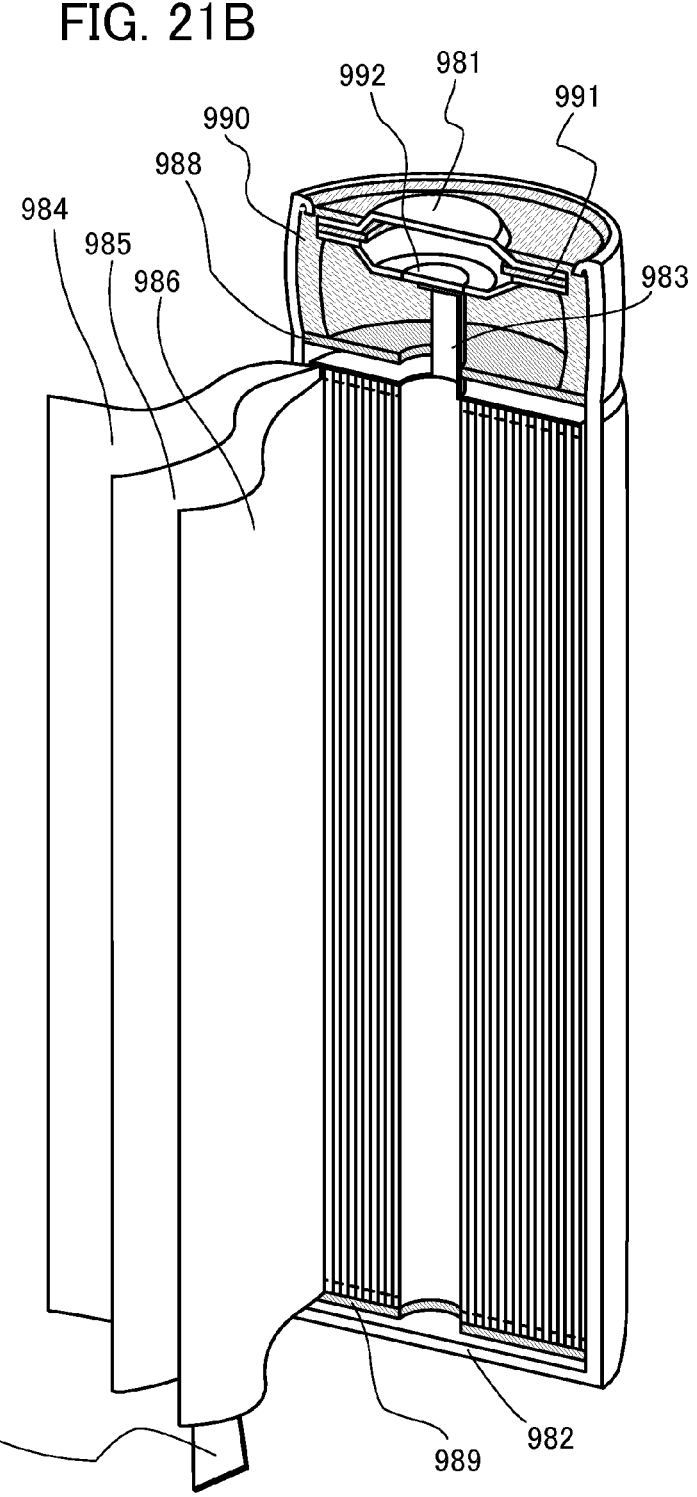
Figure 22A:
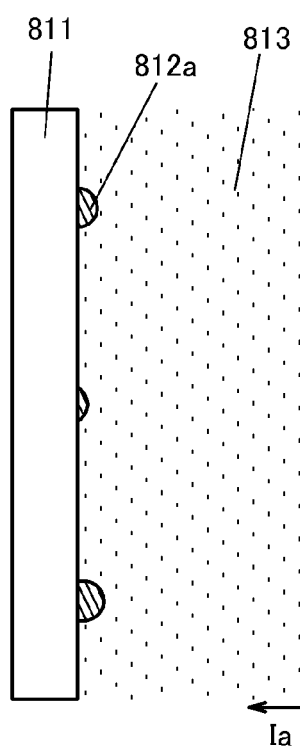
FIGS. 22A to 22F illustrate the formation and removal of a reaction product on an electrode surface.
Figure 22B:
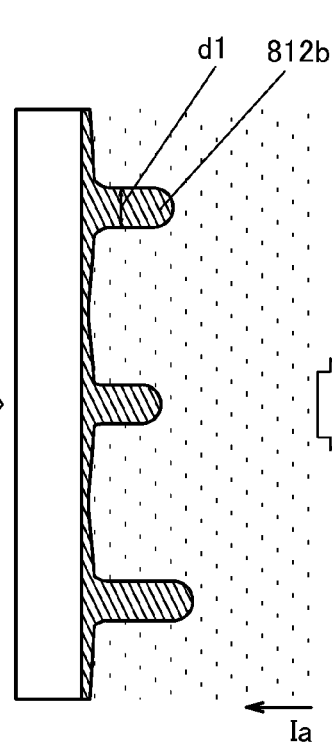
Figure 22C:
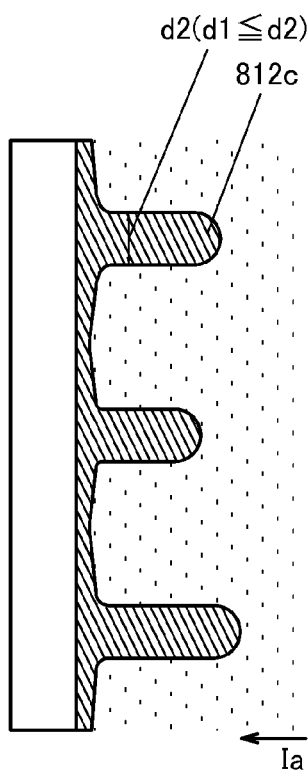
Figure 22D:
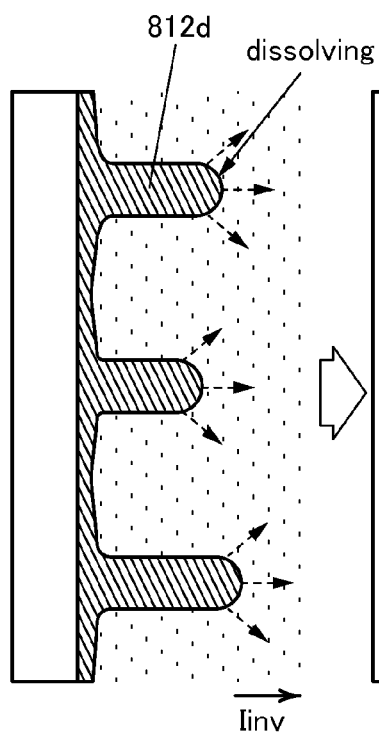
Figure 22E:
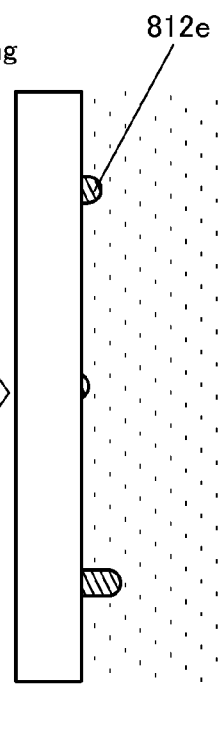
Figure 22F:
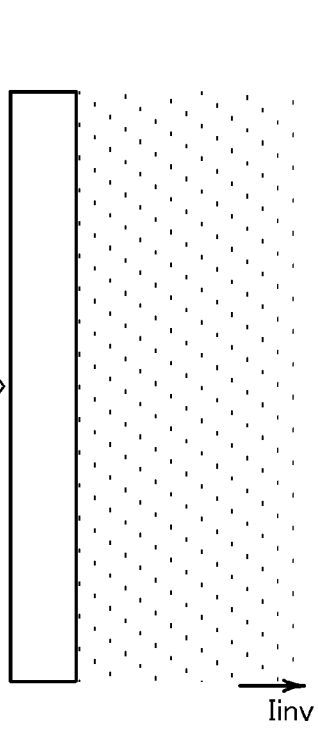
Figure 23A:
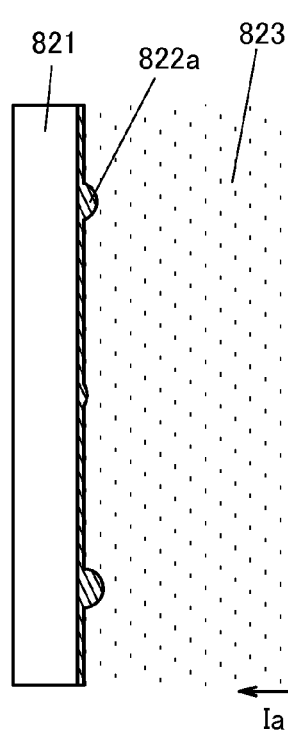
FIGS. 23A to 23F illustrate the formation and removal of a reaction product on an electrode surface.
Figure 23B:
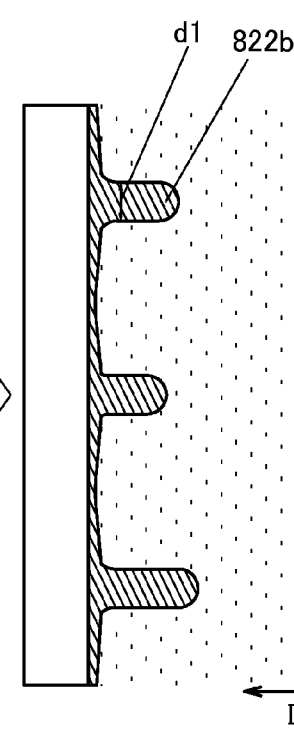
Figure 23C:
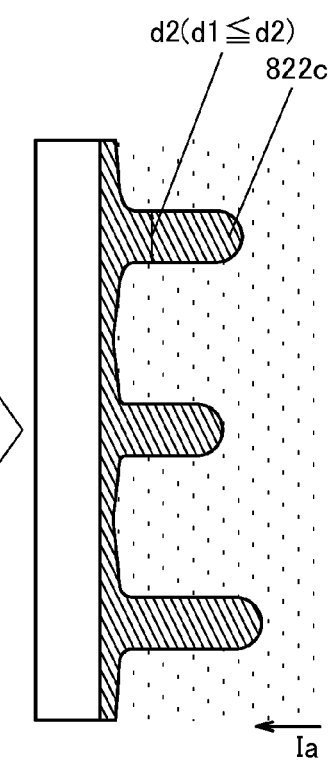
Figure 23D:
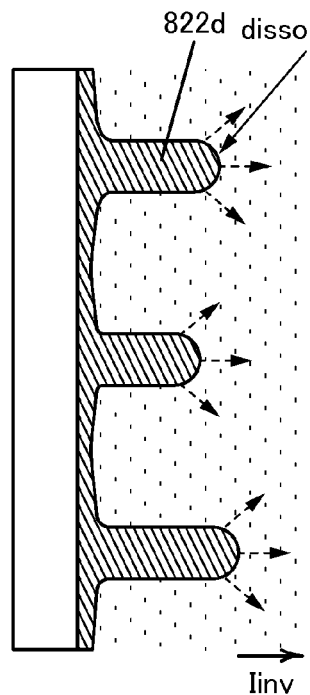
Figure 23E:
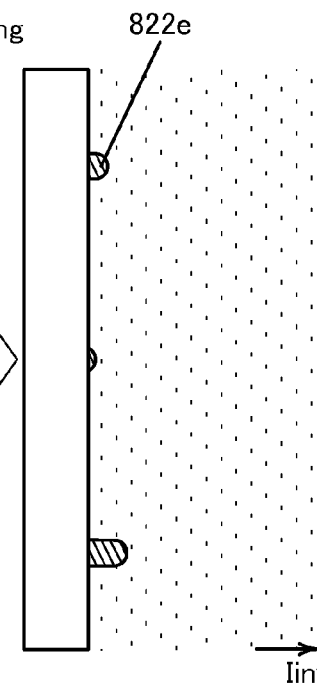
Figure 23F:
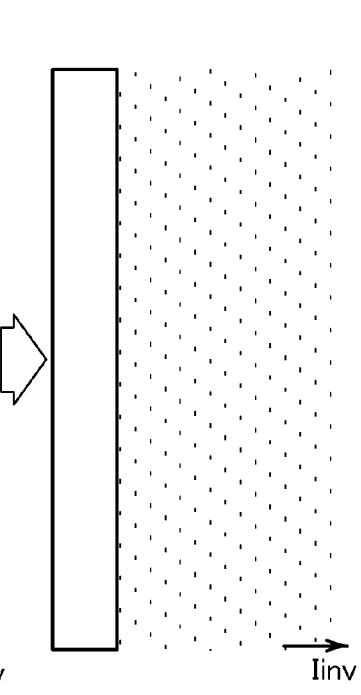
Figure 24A:
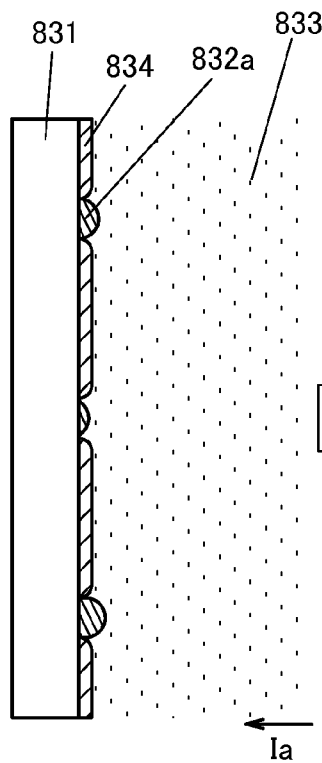
FIGS. 24A to 24F illustrate the formation and removal of a reaction product on an electrode surface.
Figure 24B:
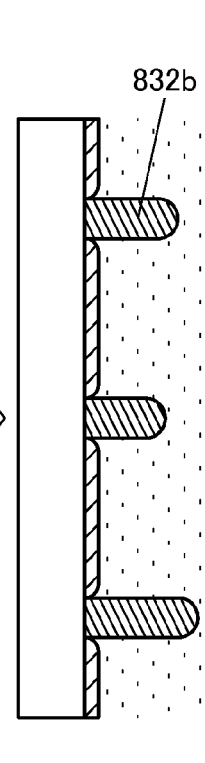
Figure 24C:
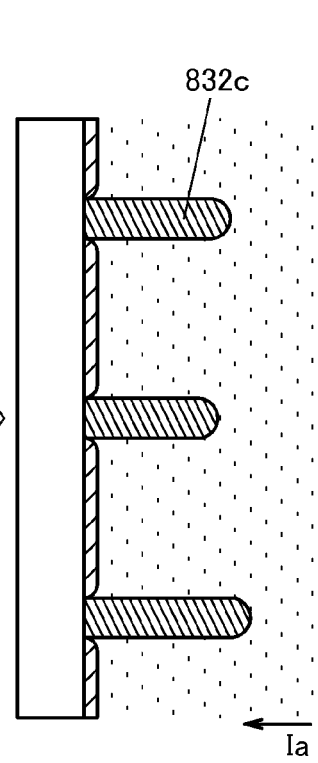
Figure 24D:
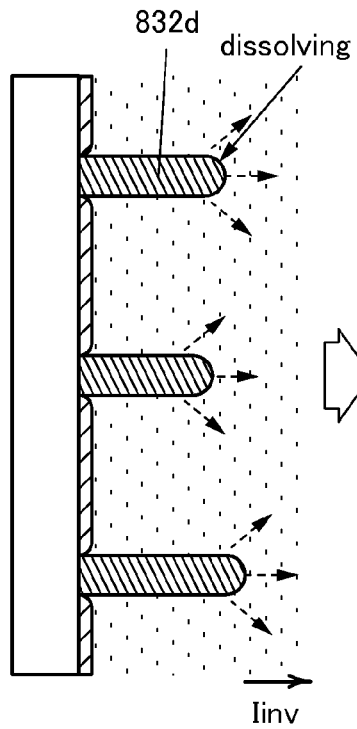
Figure 24E:
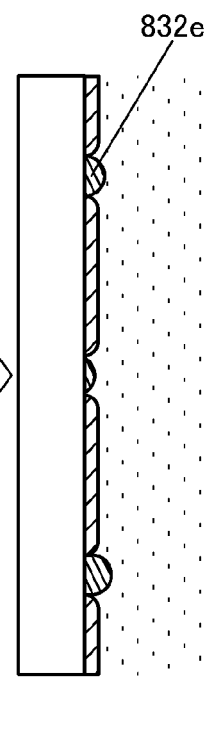
Figure 24F:
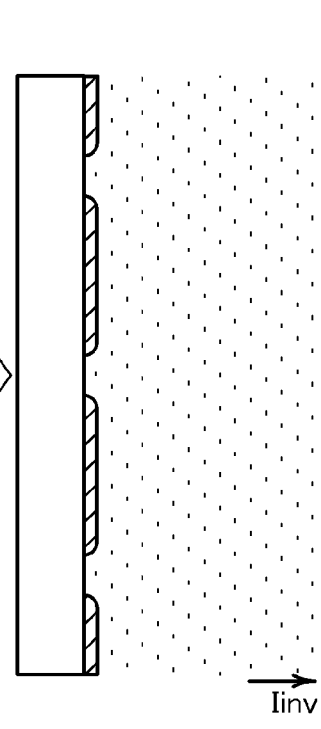

FIG. 21B is a schematic view of a cross-section of the cylindrical secondary battery. Inside the battery can 982 having a hollow cylindrical shape, provided is a battery element in which a strip-like positive electrode 984 and a strip-like negative electrode 986 are wound with a stripe-like separator 985 interposed therebetween. Although not illustrated, the battery element is wound around a center pin. The battery can 982 is closed at one end and opened at the other end.

For the positive electrode 984, the negative electrode 986, and the separator 985, the above-described members can be used.

For the battery can 982, a metal having corrosion resistance to an electrolyte solution, such as nickel, aluminum, or titanium, an alloy of such a metal, or an alloy of such a metal and another metal (e.g., stainless steel) can be used. Alternatively, the battery can 982 is preferably covered with nickel, aluminum, or the like in order to prevent corrosion caused by the electrolyte solution. Inside the battery can 982, the battery element in which the positive electrode, the negative electrode, and the separator are wound is provided between a pair of insulating plates 988 and 989 which face each other.

Further, an electrolyte solution (not illustrated) is injected inside the battery can 982 in which the battery element is provided. For the electrolyte solution, the above-described electrolyte and solvent can be used.

Since the positive electrode 984 and the negative electrode 986 of the cylindrical secondary battery are wound, active material layers are formed on both sides of the current collectors. A positive electrode terminal (positive electrode current collecting lead) 983 is connected to the positive electrode 984, and a negative electrode terminal (negative electrode current collecting lead) 987 is connected to the negative electrode 986. Both the positive electrode terminal 983 and the negative electrode terminal 987 can be formed using a metal material such as aluminum. The positive electrode terminal 983 and the negative electrode terminal 987 are connected to a safety valve mechanism 992 and the bottom of the battery can 982, respectively. The safety valve mechanism 992 is electrically connected to the positive electrode cap 981 through a positive temperature coefficient (PTC) element 991. The safety valve mechanism 992 cuts off the electrical connection between the positive electrode cap 981 and the positive electrode 984 when the internal pressure of the battery increases and exceeds a predetermined threshold value. The PTC element 991 is a heat sensitive resistor whose resistance increases as temperature rises, and controls the amount of current by increase in resistance to prevent abnormal heat generation. Barium titanate ($BaTiO_3$)-based semiconductor ceramic or the like can be used for the PTC element.

This embodiment can be freely combined with any of the other embodiments. Specifically, a signal (an inversion pulse voltage) is applied to a power storage unit of this embodiment so that a current flows in the direction opposite to that of a current with which a reaction product is formed, thereby dissolving the reaction product. As a result, deterioration of the power storage unit can be prevented or the power storage unit that has deteriorated can be repaired, and the charge and discharge performance of the power storage unit can be maximized to be maintained for a long time. In addition, the supply of a signal (an inversion pulse voltage) to the power storage unit of this embodiment to make a current flow in the direction opposite to that of a current with which a reaction product is formed, results in elimination of power storage units that suddenly stop functioning because of any cause even though they were able to be charged and discharged without any problem at the time of manufacture and were shipped as quality products.

(Embodiment 4)

Figure 25A:
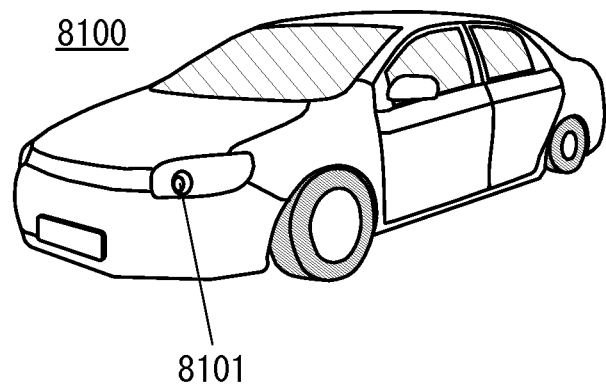
FIGS. 25A and 25B illustrate examples of a vehicle.
Figure 25B:
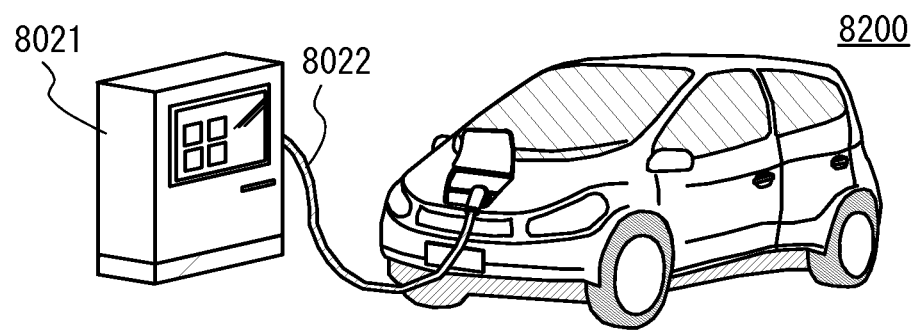

FIGS. 25A and 25B each illustrate an example of a vehicle using one embodiment of the present invention. An automobile 8100 illustrated in FIG. 25A is an electric vehicle which runs on the power of the electric motor 106. Alternatively, the automobile 8100 is a hybrid electric vehicle capable of driving using either the electric motor 106 or the engine 107 as appropriate. One embodiment of the present invention achieves a high-mileage vehicle. The automobile 8100 includes the power storage unit 120. The power storage unit 120 is used not only for driving the electric motor 106, but also for supplying electric power to a light-emitting device such as a headlight 8101 or a room light (not illustrated).

The power storage unit 120 can also supply electric power to a display device included in the automobile 8100, such as a speedometer or a tachometer. Furthermore, the power storage unit 120 can supply electric power to a semiconductor device included in the automobile 8100, such as a navigation system.

FIG. 25B illustrates an automobile 8200 including the power storage unit 120. The automobile 8200 can be charged when the power storage unit 120 is supplied with electric power through external charging equipment by a plug-in system, a contactless power supply system, or the like. In FIG. 25B, the power storage unit 120 included in the automobile 8200 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. For example, with the use of a plug-in technique, the power storage unit 120 included in the automobile 8200 can be charged by being supplied with electric power from outside. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the automobile stops but also when moves. In addition, the contactless power supply system may be utilized to perform transmission/reception between vehicles. Furthermore, a solar cell may be provided in the exterior of the automobile to charge the power storage unit 120 when the automobile stops or moves. To supply electric power in such a contactless manner, an electromagnetic induction method or a magnetic resonance method can be used.

According to one embodiment of the present invention, the power storage unit 120 can have improved cycle characteristics and reliability. Furthermore, according to one embodiment of the present invention, the power storage unit 120 itself can be made more compact and lightweight as a result of improved characteristics of the power storage unit 120. The compact and lightweight power storage unit 120 contributes to a reduction in the weight of a vehicle, and thus increases the driving distance. Further, the power storage unit 120 included in the vehicle can be used as a power source for supplying electric power to products other than the vehicle. In that case, the use of a commercial power supply can be avoided at peak time of electric power demand.

This application is based on Japanese Patent Application serial No. 2013-008726 filed with Japan Patent Office on Jan. 21, 2013, the entire contents of which are hereby incorporated by reference.

What is claimed is:

1. A vehicle comprising:
an engine;
an electric motor; and
a power storage unit for supplying electric power to the electric motor,
wherein the vehicle is configured to be operated by at least one of the engine and the electric motor, and
wherein the power storage unit is configured to be charged in a first period and discharged in a second period alternately and repeatedly while the power storage unit is supplied with electric power generated by the electric motor run by power of the engine, and
wherein a time of the second period is greater than or equal to 0.01% and less than or equal to 10% of a time of the first period.

2. The vehicle according to claim 1, further comprising:
a wheel; and
a power switching unit,
wherein the engine and the electric motor are connected to the wheel through the power switching unit.

3. The vehicle according to claim 1, wherein the time of the second period is longer than or equal to 0.1 seconds and shorter than or equal to 3 minutes.

4. A vehicle comprising:
an engine;
an electric motor; and
a first power storage unit and a second power storage unit for supplying electric power to the electric motor,
wherein the vehicle is configured to be operated by at least one of the engine and the electric motor,
wherein the one of the first power storage unit and the second power storage unit is configured to be charged by the electric motor in a first period while the vehicle is operated by the engine, and
wherein the one of the first power storage unit and the second power storage unit is configured to be discharged and the other of the first power storage unit and the second power storage unit is configured to be charged by the one of the first power storage unit and the second power storage unit in a second period while the vehicle is operated by the engine.

5. The vehicle according to claim 4, further comprising:
a wheel; and
a power switching unit,
wherein the engine and the electric motor are connected to the wheel through the power switching unit.

6. The vehicle according to claim 4, wherein a time of the second period is greater than or equal to 0.01% and less than or equal to 10% of a time of the first period.

7. The vehicle according to claim 4, wherein a time of the second period is longer than or equal to 0.1 seconds and shorter than or equal to 3 minutes.

8. The vehicle according to claim 4, wherein one of the first power storage unit and the second power storage unit is configured to be charged when the vehicle is operated by the electric motor and the other of the first power storage unit and the second power storage unit.

9. The vehicle according to claim 4, wherein one of the first power storage unit and the second power storage unit is configured to be discharged in a third period while the vehicle is operated by the electric motor, and
wherein the one of the first power storage unit and the second power storage unit is configured to be charged by the other of the first power storage unit and the second power storage unit in a fourth period while the vehicle is operated by the electric motor.

10. The vehicle according to claim 4, wherein the first power storage unit configured to supply electric power to the electric motor and the second power storage unit in a third period while the vehicle is operated by the electric motor, and
wherein the second power storage unit configured to supply electric power to the electric motor and the first power storage unit in a fourth period while the vehicle is operated by the electric motor.

11. A vehicle comprising:
an electric motor;
a first power storage unit and a second power storage unit for supplying electric power to the electric motor; and
wherein the vehicle is configured to be operated by the electric motor,
wherein the first power storage unit is configured to supply electric power to the electric motor and the second power storage unit in a first period while the vehicle is operated by the electric motor, and
wherein the second power storage unit is configured to supply electric power to the electric motor and the first power storage unit in a second period while the vehicle is operated by the electric motor, and wherein the first period and the second period perform alternately and repeatedly, wherein a time of the second period is greater than or equal to 0.01% and less than or equal to 10% of a time of the first period.

12. The vehicle according to claim 11, further comprising:
a wheel; and
a power switching unit,
wherein the electric motor are connected to the wheel through the power switching unit.

13. The vehicle according to claim 11, wherein one of the first power storage unit and the second power storage unit is configured to be charged by the other of the first power storage unit and the second power storage unit.

14. The vehicle according to claim 11, wherein one of the first power storage unit and the second power storage unit is configured to be charged when the other of the first power storage unit and the second power storage unit is discharged.

15. The vehicle according to claim 11, wherein one of the first power storage unit and the second power storage unit is configured to be charged when the vehicle is operated by the electric motor and the other of the first power storage unit and the second power storage unit.

16. The vehicle according to claim 11, wherein the electric motor is configured to be supplied with electric power from the first power storage unit in the first period and is configured to be supplied with electric power from the second power storage unit in the second period repeatedly and alternately.

* * * * *